United States Patent [19]
Terry et al.

[11] Patent Number: 5,912,895
[45] Date of Patent: Jun. 15, 1999

[54] INFORMATION NETWORK ACCESS APPARATUS AND METHODS FOR COMMUNICATING INFORMATION PACKETS VIA TELEPHONE LINES

[75] Inventors: John Brian Terry, Cumming; Roger St. Patrick Richards, Marietta, both of Ga.

[73] Assignee: Northern Telecom Limited, Montreal, Canada

[21] Appl. No.: 08/640,705

[22] Filed: May 1, 1996

[51] Int. Cl.[6] .................................................. H04L 12/413
[52] U.S. Cl. ............................................ 370/445; 375/222
[58] Field of Search .................................. 370/276, 279, 370/280, 293, 294, 445, 446, 447, 448; 375/222; 395/831, 200.8, 309, 834, 883

[56] References Cited

U.S. PATENT DOCUMENTS

| | | |
|---|---|---|
| 4,063,220 | 12/1977 | Metcalfe et al. . |
| 4,651,316 | 3/1987 | Kocan et al. . |
| 4,985,892 | 1/1991 | Camarata . |
| 5,189,664 | 2/1993 | Cheng ........................................ 370/286 |
| 5,355,365 | 10/1994 | Bhat et al. . |
| 5,515,429 | 5/1996 | Kawada et al. ........................... 370/216 |
| 5,541,967 | 7/1996 | Gluska et al. ............................ 375/364 |
| 5,636,037 | 6/1997 | Saitoh ........................................ 358/442 |
| 5,657,358 | 8/1997 | Panech et al. ............................ 375/356 |
| 5,668,857 | 9/1997 | McHale .................................... 379/93.07 |
| 5,781,617 | 7/1998 | McHale et al. .......................... 379/93.14 |

OTHER PUBLICATIONS

Anderson, "Pipes & Types: Options For Delivering Broadband Services to Residential Subscribers", *institute of Electrical and Electronics Engineers*, pp. 250–254, (1995).

*Primary Examiner*—Ajit Patel
*Attorney, Agent, or Firm*—Foley & Lardner

[57] ABSTRACT

Access to a CSMA/CD (Carrier Sense Multiple Access with Collision Detection) network is provided via a telephone line by providing a master modem at the head end and a slave modem at the subscriber end of the line. The master modem provides a CSMA/CD interface to the network and controls half duplex communications with the slave modem via the line to avoid collisions of information packets on the line. The information packets are enveloped in frames on the line with error checking information; control information between the modems is contained in the same and/or in separate frames. The modulation method and signal bandwidth can be varied depending on errors to provide optimum communications capacity via any particular line, and a ratio of upstream to downstream information packets can be varied depending on buffer fills at the modems. The master modem can be multiplexed for multiple lines. The modulated signal frequencies are above telephone signal frequencies so that each line can be frequency diplexed for simultaneous telephone communications.

71 Claims, 8 Drawing Sheets

INFORMATION NETWORK ACCESS APPARATUS AND METHODS FOR COMMUNICATING INFORMATION PACKETS VIA TELEPHONE LINES

This invention relates to information network access, and is particularly concerned with apparatus and methods for communicating information packets, generally referred to as Ethernet frames, via two-wire lines such as telephone subscriber lines.

BACKGROUND OF THE INVENTION

Computers and related devices are increasingly being connected into networks for communications between the devices. Typically, the networks comprise LANs (local area networks) which provide communications among devices within a relatively small geographical area, different LANs being interconnected via MANs (metropolitan area networks) and WANs (wide area networks). This has resulted in a global computer information network which is generally known as the Internet. The term "Network" is used herein to refer generically to this global computer information network and to any other network of computers and related devices.

Different technologies can be used to facilitate communications on any LAN and throughout the Network, the most common being Carrier Sense Multiple Access with Collision Detection (CSMA/CD) technology. This is documented in IEEE Standard 802.3 entitled "Carrier Sense Multiple Access with Collision Detection (CSMA/CD) Access Method and Physical Layer Specifications" which has been adopted by the International Organization for Standardization (ISO). The 802.3 Standard is based on the 1985 Version 2 Standard for Ethernet and, although there are some differences including different use of a length/type field, the two Standards are largely interchangeable and can be considered equivalent as far as this invention is concerned. The term "CSMA/CD" is used herein to refer generically to this technology. Using CSMA/CD, packets of data are communicated in frames that are generally referred to as Ethernet frames. This term is also used herein, regardless of whether the frames comply with the 802.3 Standard or the Ethernet Standard (i.e. regardless of the value contained in the length/type field of the frame).

The OSI (Open Systems Interconnection) reference model established by the ISO defines packetized communications protocols in seven layers, of which Layer 1 is the physical layer which is concerned with the physical interfaces between devices and the communications medium, and Layer 2 is the data link layer which is concerned with sending and receiving blocks of data together with information for example for synchronization and error and flow control. For LANs, the data link layer is generally considered as comprising two sub-layers, referred to as the LLC (logical link control) layer and the MAC (medium access control) layer. The LLC layer (Layer 2) is addressed by IEEE Standard 802.2. The CSMA/CD Standards address communications at the MAC and physical layers (Layers 2 and 1).

A particularly convenient and popular physical medium for LAN communications is twisted pair wiring as is commonly used for telephone communications. Such wiring typically consists of 0.4 mm to 0.6 mm diameter (26 AWG to 22 AWG) unshielded wires twisted together in pairs in a multipair cable. For example, one of the options for the physical layer documented for CSMA/CD is referred to as 10BASE-T and provides baseband communications at a data rate of 10 Mb/s over twisted pair wiring. The performance specifications are generally met by up to 100 m (meters) of 0.5 mm telephone twisted pair wire without the use of a repeater. Longer wiring lengths are permitted as long as the performance specifications, in particular a maximum delay, are met.

Accordingly, devices that are located relatively close to one another, for example within a building, can be relatively easily connected in a LAN using twisted pair wiring. For CSMA/CD communications via the LAN and for access to the Network, each device is easily equipped with an Ethernet interface card, which is connected via a respective twisted pair of wires to a repeater or CSMA/CD hub, and with TCP/IP (Transmission Control Protocol/Internet Protocol) software that handles the packetized communications at Layers 3 and 4 of the OSI model (Network and Transport Layers, respectively).

Increasingly, access to the Network is required from devices that are relatively distant from existing Network facilities. For example, such devices may be located within residences and small businesses, and they may be isolated computers or they may be connected in a LAN that is not connected to the rest of the Network. Such devices may for example comprise general-purpose computers or specific-purpose devices such as a Network browser, game machine, and/or entertainment device, and may also comprise related and/or ancillary equipment such as workstations, printers, scanners, bridges, routers, etc. that it may be desired to connect to the Network. The generic term "terminal device" and its abbreviation "TD" is used below to embrace all such devices.

It is known to provide for access to the Network from a relatively distant terminal device, or TD, via a communications path between a router on the Network and the distant TD, the communications path typically being constituted by a telephone line.

A simple form of such a communications path is a serial link comprising modem communications via a conventional two-wire telephone line. At Layers 1 and 2 of the OSI model the CSMA/CD communication, which can not be used on the serial link because of its length and characteristics, is replaced for the communication with each distant TD by modem communications via the respective telephone line and a point-to-point protocol, such as PPP (Point to Point Protocol) or SLIP (Serial Link Internet Protocol). Currently, modem communications generally provide a maximum data rate of 28.8 kb/s, and may typically operate in practice at lower, fall-back, data rates such as 19.2 or 14.4 kb/s. Such data rates are increasingly insufficient to meet demands imposed on communications for Network access, in particular for rapid downloading of relatively large amounts of data, e.g. for graphics. In addition, use of such modem communications prevents simultaneous use of the telephone line for telephone communications. Furthermore, such a communications path is set up as a dialled connection via the public switched telephone network (PSTN), which involves the inconvenience to the distant TD user of having to establish the dialled connection and the disadvantage of long connection times via the PSTN.

An alternative form of telephone communications path comprises an ISDN (Integrated Services Digital Network) telephone line. This provides two 64 kb/s B-channels each of which can be used for carrying voice communications or data. A TD can be connected to the ISDN line via a terminal adapter, which can thereby provide a total bit rate of 128 kb/s for data on both B-channels, or 64 kb/s for data on one B-channel simultaneously with digital telephone voice communications on the other B-channel. While this provides a significant increase in data rate compared with using a conventional two-wire telephone line, it requires an ISDN telephone line which, in the relatively limited areas in which it is available, involves additional cost, and the connection still has the disadvantage of being a dialled connection via the telephone network. In addition, a terminal adapter is generally more costly than a modem. Furthermore, even data rates of 64 kb/s or 128 kb/s are likely to be increasingly insufficient with evolution of the Network.

Higher speed telecommunications lines may be available for lease to provide high data rate communications, but these are not economical for TDs in residences and most small businesses. Cable modems have also been proposed for providing Network access via coaxial (coax) or hybrid fiber-coax (HFC) cable television distribution networks that provide bidirectional communications. While such proposals offer the possibility of high data rates, they are also limited to their own serving areas and are likely to involve relatively high costs for both the modem equipment and the ongoing use of the service.

Accordingly, there is an increasing need to facilitate access from terminal devices to the Network at relatively low cost both for equipment and ongoing service, that is not restricted to particular areas, that provides for high data rates, and that desirably does not preempt telephone communications or require long connection times via the PSTN. An object of this invention is to address this need.

SUMMARY OF THE INVENTION

According to one aspect, this invention provides a method of communicating information packets to and from a CSMA/CD (Carrier Sense Multiple Access with Collision Detection) path via a bidirectional communications path, comprising the steps of: coupling a first end of the communications path to the CSMA/CD path via a first modem having a CSMA/CD interface coupled to the CSMA/CD path whereby said information packets are communicated between the CSMA/CD path and the first modem; coupling a second end of the communications path to a second modem; and communicating said information packets between the first and second modems via the communications path using half duplex communications.

The half duplex communications, which can alternatively be considered as time division duplex or time compression multiplex communications, avoid collisions or interference between information packets communicated in the two directions of communication on the communications path by ensuring that the communications in the two directions take place at different times.

Preferably the half duplex communications are controlled by the first modem, the method further comprising the step of communicating control information via the communications path from the first modem to the second modem. The information packets can be communicated by enveloping them in information frames which also comprise error check fields for error checking of at least the enveloped information packets. Information relating to operation of the modems, such as control information from the first modem to the second modem and response information from the second modem to the first modem, can be included in at least some of the information frames and/or in further frames which comprise this information and an error check field for error checking of at least this information.

Preferably each information packet communicated between the modems via the communications path comprises at least address, length, and data fields of an Ethernet frame communicated via the CSMA/CD path; it desirably also comprises a frame check sequence of the respective Ethernet frame, and may further comprise a preamble and start frame delimiter of an Ethernet frame.

Advantageously, the communications path comprises a two-wire telephone subscriber line and the modems communicate said information packets via the line at frequencies greater than telephone signal frequencies, the method further comprising the steps of communicating telephone signals via the line and, at each end of the line, combining telephone signals and information packets to be communicated via the line, and separating telephone signals and information packets communicated via the line, using a diplexer.

The method can further comprise the step of multiplexing the first modem for communicating information packets between the first modem and a plurality of second modems via respective two-wire (e.g. telephone subscriber) lines.

The method can further comprise the steps of monitoring errors in communicating said information packets between the first and second modems via the communications path, and determining operations of the first and second modems in dependence upon monitored errors. The step of determining operations of the modems in dependence upon monitored errors can comprise varying a signal bandwidth and/or a modulation method of the modems. This enables an optimum rate to be achieved for communicating information packets via any particular two-wire line.

The second modem can have a CSMA/CD interface, the method further comprising the step of communicating said information packets between the second modem and a second CSMA/CD path via the CSMA/CD interface of the second modem.

Another aspect of the invention provides a method of providing communications with a CSMA/CD network via a bidirectional communications path, comprising the steps of: at a first end of the communications path, providing a CSMA/CD interface to the network, buffering information packets received from the network via the interface in a first buffer, supplying information packets from the first buffer to the communications path, and supplying control information to the communications path; at a second end of the communications path, buffering information packets received via the communications path in a second buffer, receiving the control information from the communications path, buffering information packets to be supplied via the communications path to the network in a third buffer, and supplying information packets from the third buffer to the communications path in dependence upon the control information; and at the first end of the communications path, supplying information packets received via the communications path to a fourth buffer, and supplying the information packets from the fourth buffer to the network via the interface; wherein the control information and the dependence on the control information for supplying information packets from the third buffer to the communications path are arranged to avoid collisions on the communications path between information packets communicated from the first buffer to the second buffer and information packets communicated from the third buffer to the fourth buffer.

This method can further comprise the steps of monitoring fills of at least some of the buffers, and varying a ratio of information packets communicated from the first buffer to the second buffer to information packets communicated from the third buffer to the fourth buffer in dependence upon the monitored fills. This enables a variable ratio of information packets communicated in the two directions of communication to be achieved dynamically to provide an optimum flow of information packets at all times.

Preferably in this method the information packets are communicated via the communications path as modulated signals between modems at the first and second ends of the communications path.

This method can further comprise the steps of providing a second CSMA/CD interface to a second CSMA/CD path at the second end of the communications path and communicating information packets between the second and third buffers and the second CSMA/CD path via the second CSMA/CD interface. The method can then further comprise the step of jamming the second CSMA/CD path from the second CSMA/CD interface in response to filling of the third buffer. The jamming of the second CSMA/CD path is detected as a collision by devices connected to that path, causing retransmission of information packets that for the time being can not be received by the third buffer.

The invention also provides a method of coupling a terminal device to a CSMA/CD network via a two-wire telephone subscriber line, comprising the steps of: coupling a first end of the line to the network via a first modem including a CSMA/CD interface to the network; coupling a second end of the line to the terminal device via a second modem including an interface to the terminal device; communicating information packets downstream from the network to the terminal device via the CSMA/CD interface, first modem, line, second modem, and terminal device interface; communicating control information downstream from the first modem to the second modem; and communicating information packets upstream from the terminal device to the network via the terminal device interface, second modem, line, first modem, and CSMA/CD interface under control of the control information at times to avoid interference with the information packets and control information communicated downstream.

A further aspect of the invention provides a network access arrangement for providing communications with a CSMA/CD path via a communications path, comprising: a first unit for coupling a first end of the communications path to the CSMA/CD path, the first unit comprising a CSMA/CD interface for connection to the CSMA/CD path, a buffer for buffering information packets supplied from the CSMA/CD path via the CSMA/CD interface for supply to the communications path, a buffer for buffering information packets received from the communications path for supply to the CSMA/CD path via the CSMA/CD interface, and a control unit; and a second unit for connection to a second end of the communications path, the second unit comprising a buffer for buffering information packets received via the communications path, a buffer for buffering information packets to be supplied to the communications path, and a control unit; wherein the control units of the first and second units are arranged to exchange control information via the communications path for communicating information packets bidirectionally via the communications path between the buffers of the first and second units in a half duplex manner.

Conveniently the first and second units comprise modems for communicating the information packets and control information as modulated signals via the communications path. Preferably the modems of the first and second units are arranged to produce the modulated signals at frequencies greater than telephone signal frequencies, and each of the first and second units includes a frequency diplexer via which the units are coupled to the communications path, the diplexers having further connections for telephone equipment for simultaneous communications of telephone signals via the communications path.

The invention further provides a modem for communicating information packets of Ethernet frames via a two-wire line, comprising: a control unit; an interface for supplying and receiving information packets of Ethernet frames; a first buffer for receiving and buffering information packets from the interface; a modulator responsive to the control unit for supplying modulated signals comprising information packets from the first buffer to a two-wire line; a demodulator for demodulating modulated signals received via the two-wire line to produce demodulated signals; and a second buffer for receiving and buffering information packets contained in the demodulated signals for supply to the interface; wherein the control unit is arranged to produce or respond to control information in the modulated signals on the two-wire line to control the modulator to supply modulated signals to the two-wire line only at times when modulated signals are not being received via the two-wire line.

The interface can comprise a CSMA/CD interface to a CSMA/CD path, or it can comprise a direct interface to a terminal device.

The control unit can be arranged to produce said control information for said modulated signals on a plurality of two-wire lines, the modem comprising respective first and second buffers for buffering information packets in respect of each of the plurality of lines, the modem further comprising a demultiplexer controlled by the control unit to couple any of the plurality of two-wire lines to the demodulator, and a multiplexer controlled by the control unit to couple the modulator to any of the plurality of two-wire lines.

BRIEF DESCRIPTION OF THE DRAWINGS

The invention will be further understood from the following description with reference to the accompanying drawings, in which.

DETAILED DESCRIPTION

Figure 1:
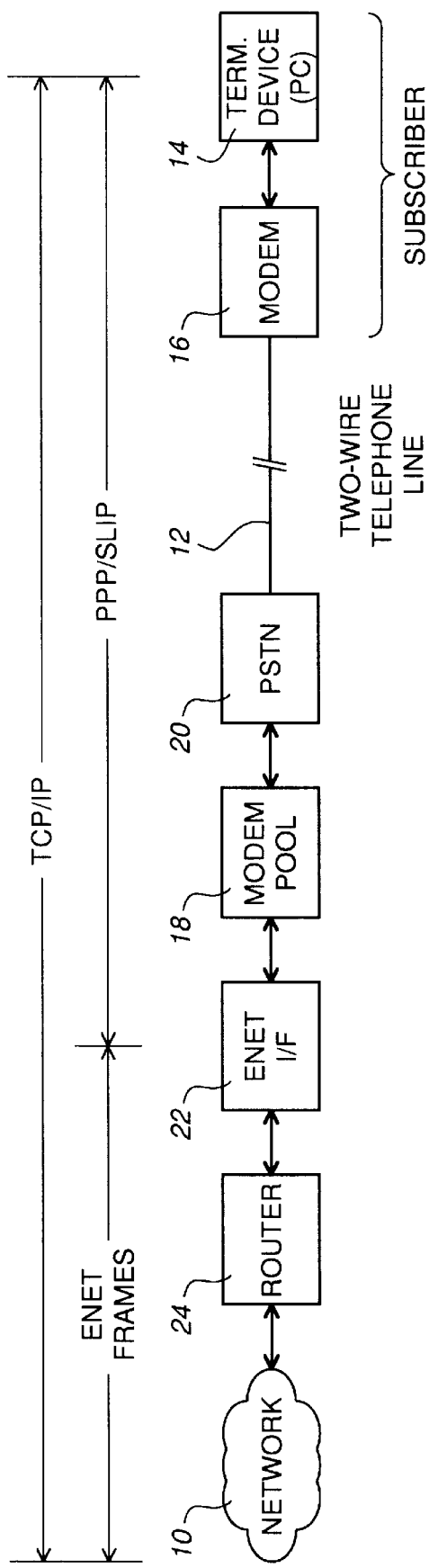
FIG. 1 schematically illustrates a known Network access arrangement.

FIG. 1 illustrates elements of a known arrangement for access from a subscriber to the Network 10 via a conventional two-wire telephone line 12. Subscriber equipment includes a terminal device (TD) 14 which for example is constituted by a personal computer (PC), and a modem 16 connected to the line 12 and for example providing a maximum data rate of 28.8 kb/s. Although shown separately from the TD 14, the modem 16 can instead be incorporated therein. The modem 16 communicates with a modem in a pool of dial-up modems 18 with a dialled connection which is established in well-known manner via the PSTN 20 to which the telephone line 12 is connected. The modems in the modem pool 18 are connected via an Ethernet interface (ENET I/F) 22 to a router 24 which is connected to the Network 10 and hence can be considered to be a part of the Network, the Network 10 generally being considered to include all of the terminal devices connected to it.

An upper part of FIG. 1 illustrates protocols in accordance with which the arrangement operates. TCP/IP operates at OSI Layers 3 and 4 end-to-end throughout the entire Network and access arrangement, with TCP/IP software running on the TD 14. At the MAC layer of OSI Layer 2, communications in the access arrangement between the Ethernet interface 22 and the TD 14 operate in accordance with a point-to-point protocol such as PPP or SLIP, and communications between the Ethernet interface 22 and the Network 10, and within the Network 10, comprise Ethernet frames as described below with reference to FIG. 2. These frames can be carried in a wide variety of forms and via various physical media, for example as the Ethernet frames themselves on a CSMA/CD LAN, in ATM (asynchronous transfer mode) cells, in SONET (synchronous optical network) formats, and so on. For communications between the Network 10 and the TD 14, the router 24 converts between the Ethernet frames of the Network and the serial communications on the line 12 between the modems 16 and 18.

A generally similar arrangement to that of FIG. 1 is provided in the event that the telephone line is an ISDN line, except that the modem 16 is replaced by an ISDN terminal adapter and communications on the line are digital at a rate that can be 64 or 128 kb/s.

Figure 2:
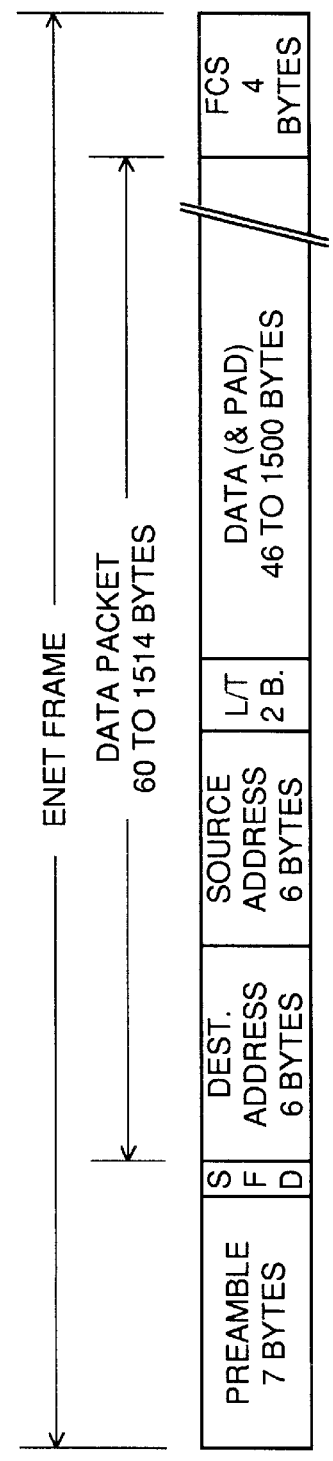
FIG. 2 illustrates the known format of an Ethernet frame.

FIG. 2 illustrates the Ethernet frame at the MAC layer. It consists of, in order, a preamble field of 7 bytes or octets (8 bits) of alternating 1s and 0s starting with a 1; a start frame delimiter (SFD) field of 1 byte having the sequence 10101011; a destination address field of 6 bytes; a source address field of 6 bytes; a length or type field of 2 bytes described further below; a data field of 46 to 1500 bytes, and a frame check sequence (FCS) field of 4 bytes or octets constituted by a CRC (cyclic redundancy check) of the data packet constituted by the address, length or type, and data fields. Data of less than 46 bytes in a frame is padded to the minimum data field size of 46 bytes. In accordance with the 802.3 Standard, the length or type field represents the length of data in the data field up to the maximum of 1500 bytes. In accordance with the Ethernet Standard, the length or type field is a value greater than 1500 that represents the type of data packet, and IP data packets are identified by one specific type value in this field. Thus the two Standards are different but inter-operable in this respect. It follows from this format that each frame comprises a data packet of from 60 to 1514 bytes, together with overhead (preamble, SFD, and FCS fields) of 12 bytes.

In accordance with the CSMA/CD Standards, the bits of each Ethernet frame are communicated using Manchester coding (a 1 bit is encoded as a 01 sequence, and a 0 bit is encoded as a 10 sequence, in each case with a transition in the middle of the bit period) at a predetermined data rate which is typically 10 Mb/s. Any terminal device connected to a CSMA/CD LAN can transmit a frame to the LAN (Multiple Access) in accordance with a contention scheme which is summarized by the following steps:

1. Monitor the LAN (Carrier Sense).
2. When the LAN is idle, transmit.
3. While transmitting, monitor the LAN for a collision (Collision Detection) by comparing transmitted bits with what is received from the LAN.
4. When a collision is detected, continue transmitting for a short period so that all TDs on the LAN detect the collision (this is referred to as jamming). Wait a random period of time determined by a binary exponential back-off algorithm, then return to step 1 for retransmission.

The minimum and maximum Ethernet frame size, predetermined data rate, and characteristics and lengths of segments of the LAN are inter-related in a manner that ensures effective operation of this contention scheme. For a 10BASE-T LAN using twisted pair wiring, as explained in the background of the invention this results in a maximum segment length of the order of 100 meters.

The two-wire telephone line 12 in the arrangement of FIG. 1 is constituted by twisted pair wiring, but has a length which is invariably much greater than 100 meters. Typically the length may be a maximum of about 5500 meters, with an average length for telephone lines in North America of the order of 1700 meters. These lengths are much greater than the approximate 100 meter maximum for a 10BASE-T LAN, and propagation delays make it impossible for the contention scheme outlined above to operate over such distances of twisted pair wiring. Even if this were not the case, signal attenuation over these distances of twisted pair wiring would make it very difficult to provide any reliable detection of collisions. Accordingly, it is not practical to use CSMA/CD on the telephone line 12. Instead, the serial link point-to-point protocols are used in conjunction with the modems 16 and 18 as discussed above to provide Network access, with the data rate and other limitations discussed in the background of the invention.

Figure 3:
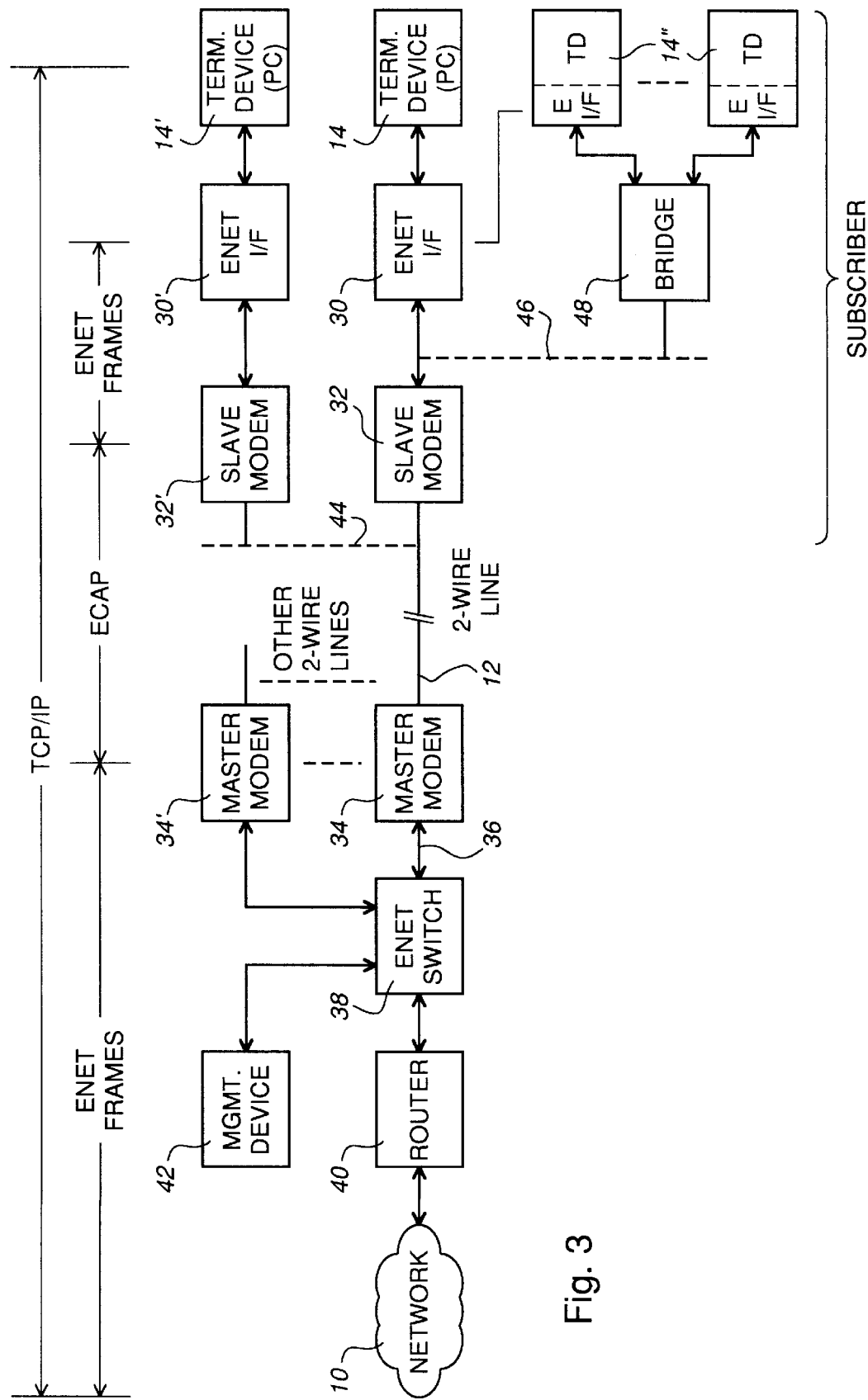
FIG. 3 schematically illustrates a Network access arrangement in accordance with an embodiment of this invention.

FIG. 3 illustrates a Network access arrangement in accordance with an embodiment of this invention which is described first below, and also illustrates variations of this which are described subsequently below.

In FIG. 3, a TD 14 of a subscriber is again connected to the Network 10 via a two-wire telephone subscriber line 12 which in this arrangement, as in the arrangement of FIG. 1, is not being used for telephone communications. The TD 14 in this arrangement is connected to the line 12 via an Ethernet interface (ENET I/F) 30 and a modem 32. The interface 30 is a conventional Ethernet interface which, although shown separately from the TD 14 in FIG. 3, can be conveniently incorporated into the TD 14 either on a plug-in card or as a permanent part of the TD 14. The interface 30 is the same as would be provided for connecting the TD 14 directly to a CSMA/CD LAN. The modem 32 has a form for example as described in detail below with reference to FIG. 8, and has an Ethernet interface that is connected to the interface 30, and a two-wire line interface that is connected to the line 12. Conveniently, the connection between the Ethernet interface 30 and the modem 32 is a 10BASE-T connection using twisted pair wiring. The modem 32 is referred to below as a slave modem as explained further below. The Ethernet interface 30 provides a Network address for the TD 14 as is well known. Similarly, the Ethernet interface within the modem 32 provides this with a Network address. Although the slave modem 32 is shown separately from the interface 30 and the TD 14, the modem 32 can be physically combined with the Ethernet interface 30 for example as described below with reference to FIG. 15, and can be incorporated into the TD 14.

At its other end, for example at a PSTN central office (CO) or remote terminal (RT), the two-wire telephone line 12 is connected to a modem 34 which is referred to as a master modem and an example of which is described below with reference to FIG. 7. The modem 34 also has a 10BASE-T Ethernet interface which provides the master modem with a Network address. This interface is connected via twisted pair wiring 36, an Ethernet switch 38, and a router 40 to the rest of the Network 10 in known manner. As is well known, functions of the switch 38 and router 40 can be combined in a single device referred to as a brouter.

An upper part of FIG. 3 illustrates, in a similar manner to FIG. 1, protocols in accordance with which the Network access arrangement operates. As in the arrangement of FIG. 1, TCP/IP operates at OSI Layers 3 and 4 end-to-end throughout the entire Network and access arrangement, with TCP/IP software running on the TD 14. At the MAC layer, communications within and between the Network 10, router 40, switch 38, and master modem 34 comprise Ethernet frames as described above. Similarly, communications between the slave modem 32 and the Ethernet interface 30 comprise Ethernet frames as described above, and the TD 14 operates in exactly the same known manner as it would if the interface 30 were connected directly to a LAN.

Communications between the master modem 34 and the slave modem 32 are carried out in accordance with a new point-to-point protocol which uses collision avoidance to communicate Ethernet frames between the modems. This protocol is described below and for convenience is referred to herein as ECAP (Ethernet frame Collision Avoidance Protocol). It is observed that this protocol operates only between the modems 32 and 34, and hence need not be known to, and does not change the operation of, the TD 14 or the rest of the Network 10. The protocol and modems simply serve to replace a direct (short-distance) connection between the interface 30 and the twisted pair wiring 36 by a remote connection via the (much greater distance) two-wire line 12. Thus although as described here the line 12 is a telephone subscriber line, it can be appreciated that the same arrangement of master and slave modems operating in accordance with this new protocol can be used to communicate Ethernet frames via any twisted pair wiring which is too long to permit conventional 10BASE-T or similar LAN interconnections.

FIG. 3 also illustrates a management device 42, for example a computer, coupled to the Ethernet switch 38 for providing operations, administrations, management, test, and other functions relating to the communications in known manner. In order to provide communications via multiple lines 12 to multiple subscribers, preferably the master modem 34 contains multiplexing functions as described below with reference to FIG. 7, and other master modems, one of which is illustrated in FIG. 3 and referenced 34', are connected to the switch 38 similarly to the modem 34.

At the subscriber, one or more further arrangements of a slave modem 32', Ethernet interface 30', and TD 14' can be similarly connected to the same two-wire line 12 as shown by a dashed line connection 44. Alternatively (or in addition), and generally more desirably, as shown by a dashed line connection 46 the 10BASE-T connection of the slave modem 32 can be connected to a bridge 48 of known form, to which a plurality of TDs 14", can be connected via their respective Ethernet interfaces (EI/Fs) in known manner to provide a subscriber LAN. These arrangements can be extended as desired in known manner.

It can be seen from the above description that embodiments of the invention are centered on the arrangement and functioning of the modems 32 and 34. Before describing embodiments of these in detail, a further Network access arrangement is described below with reference to FIG. 4. This further arrangement illustrates that the communications on each line 12 can comprise not only the data communications for the Network as described herein but also conventional telephone communications.

Figure 4:
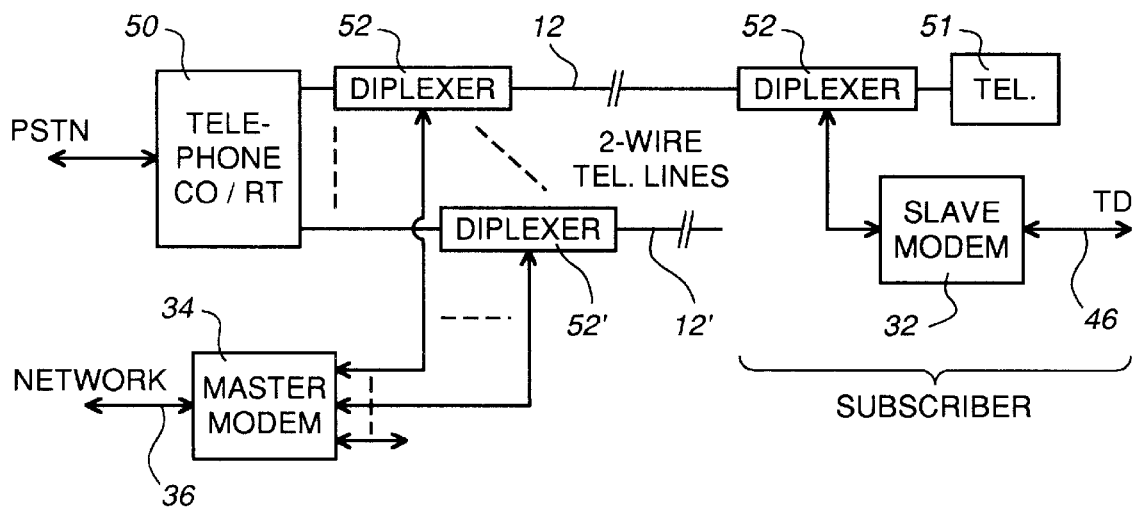
FIG. 4 schematically illustrates a Network access arrangement, providing for simultaneous telephone communications, in accordance with another embodiment of this invention.

Referring to FIG. 4, this illustrates the master and slave modems 34 and 32 respectively, with 10BASE-T interfaces to twisted pair wiring 36 and 46 respectively as described above, coupled via a two-wire subscriber line 12 which also serves for conventional telephone connections between a subscriber telephone 51 and a telephone CO or RT 50 connected to the PSTN. To this end, a passive diplexer 52 is provided at each end of the two-wire line 12, the two diplexers 52 conveniently having the same form and being for example as described below with reference to FIG. 5. Thus at a head end of the line 12 the CO or RT 50 and the master modem 34 are connected via a diplexer 52 to the line 12, and at a subscriber end of the line 12 the subscriber telephone 51 and the slave modem 32 are connected to the line 12 via a diplexer 52. As also shown in FIG. 4, the master modem 34 can be multiplexed for other telephone subscriber lines 12' to which it is similarly connected via respective diplexers 52'. It can be appreciated that diplexers can be similarly provided in the arrangement of FIG. 3 to permit simultaneous telephone and Network communications.

Figure 5:
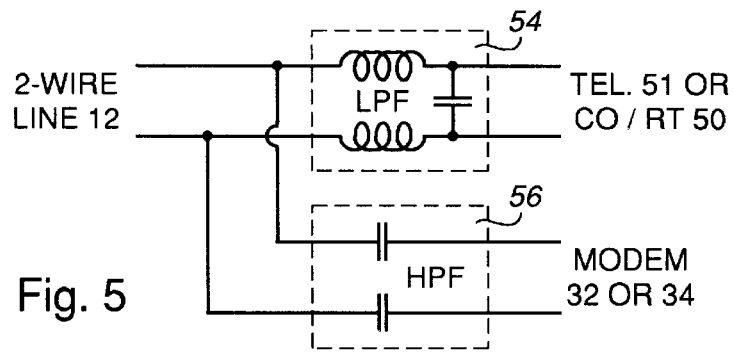
FIG. 5 schematically illustrates a diplexer used in the arrangement of FIG. 4.

FIG. 5 illustrates a simple form of the diplexer 52, which comprises a d.c. and low pass filter (LPF) 54 between a two-wire connection to the line 12 and a two-wire connection to the telephone 51 or CO or RT 50, and a d.c. isolator and high pass filter (HPF) 56 between the two-wire connection to the line 12 and a two-wire connection to the modem 32 or 34. As illustrated in FIG. 5, the LPF 54 can comprise one or more balanced filter sections comprising series inductors (which pass the telephone loop current) and shunt capacitors, and the HPF 56 can comprise two series capacitors having a capacitance such that they do not represent a significant load to the line 12. More complicated forms of diplexer 52 can be provided as desired.

Figure 6:
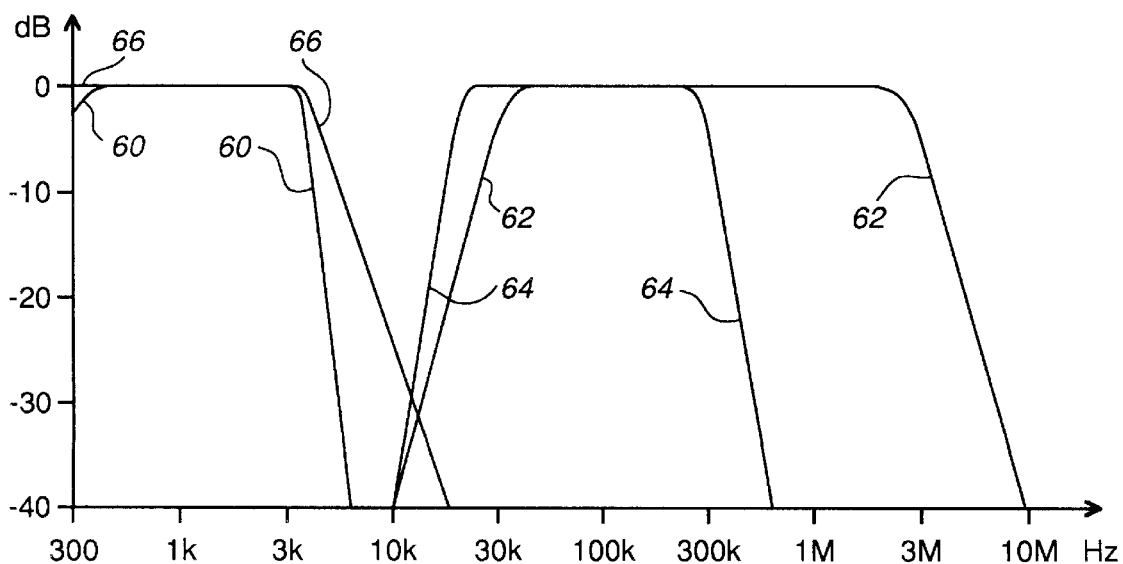
FIG. 6 shows a graph illustrating frequency characteristics related to the arrangement of FIG. 4.

The graph in FIG. 6 illustrates the low frequency spectrum 60 of analog telephony signals, and two high frequency spectra 62 and 64 for Network communications. A desirable response 66 for the LPF 54 of the diplexer 52 separates the low frequency telephony signals on the two-wire line 12 from the Network communications signals on the same line 12. It can be seen from this illustration that the telephony and Network communications signals occupy substantially different frequency bands and hence are easily separated by the diplexers 52.

In FIG. 6, the spectra 62 and 64 relate to two different signal bandwidths which can be used for the Network communications. For example, the relatively wide bandwidth spectrum 62 can correspond to a modulation method with a symbol or clock rate of 3 MHz, and the relatively narrower bandwidth spectrum 64 can correspond to a modulation method with a symbol or clock rate of 300 kHz. Other signal bandwidths, not shown, can be similarly provided. The use of different bandwidths and modulation methods is described further below.

Figure 7:
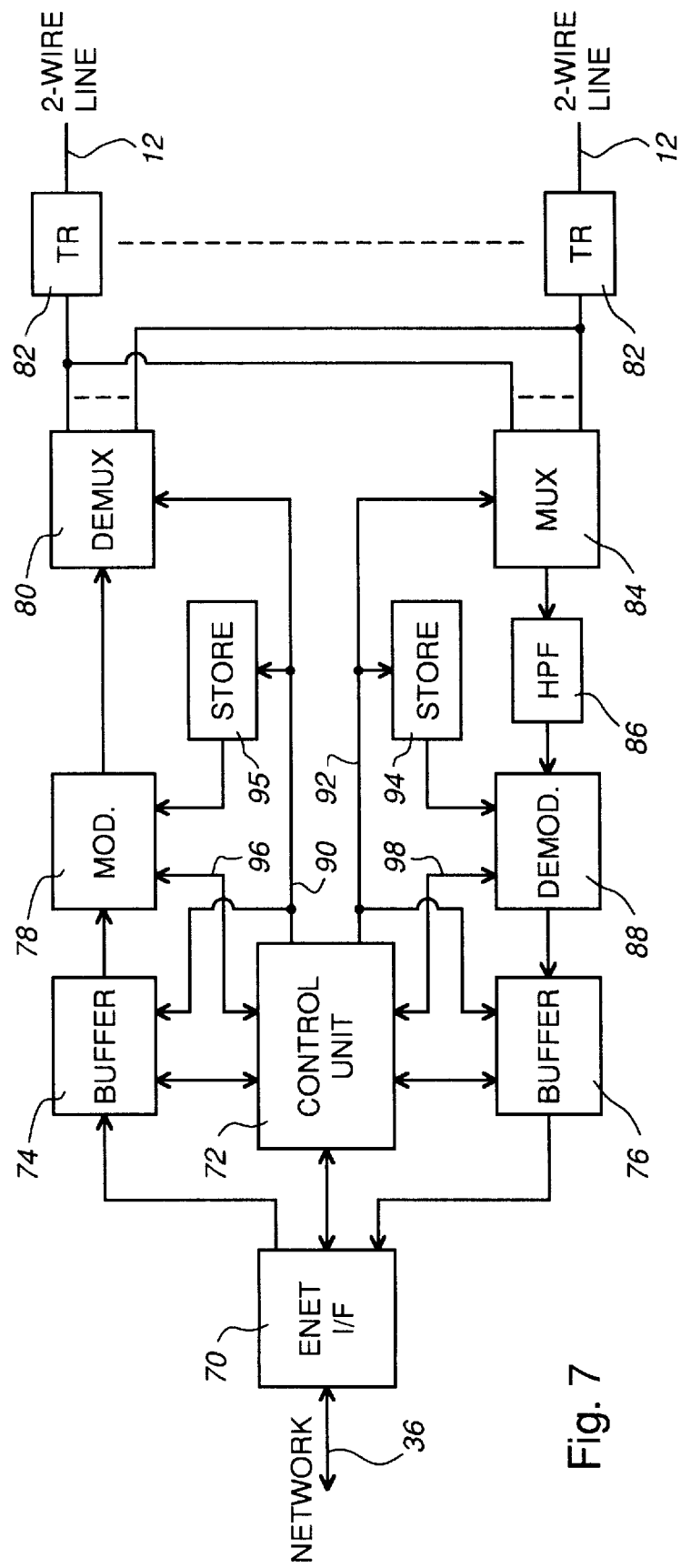
FIG. 7 schematically illustrates a master modem provided in the Network access arrangements of FIGS. 3 and 4.

FIG. 7 illustrates a form of the master modem 34, including optional but desirable multiplexing for a plurality of two-wire lines. The master modem includes an Ethernet interface 70 of known form providing a 10BASE-T connection to the twisted pair wiring 36 and providing (for example from a read-only memory within the interface 70) a Network address for the master modem. The interface 70 is connected to a control unit 72 of the master modem, to the input of a FIFO (first in, first out) buffer 74 for buffering downstream Ethernet frames supplied from the Network via the wiring 36 and the interface 70, and to the output of a FIFO buffer 76 for supplying upstream Ethernet frames via the interface 70 and the wiring 36 to the Network. An output of the buffer 74 is coupled via a modulator 78 and a downstream demultiplexer 80 (constituted by switches) to a respective one of the multiplexed two-wire lines 12 via a respective isolating transformer (TR) 82, the output of the modulator 78 providing a matched termination for the line 12. An upstream multiplexer 84 (constituted by switches) has inputs also coupled to the lines 12 via the transformers 82, and has an output coupled via a high pass filter (HPF) 86 which provides a matched termination for the respective line 12 to which it is connected via the multiplexer 84. An output of the HPF 86 is connected to an input of a demodulator 88 having an output connected to an input of the buffer 76. The transformers 82 can also provide a balun function between the balanced lines 12 and the demultiplexer 80 and multiplexer 84.

The demultiplexer 80 and multiplexer 84 are addressed by the control unit 72 via address lines 90 and 92 respectively to provide downstream frames to and to receive upstream frames from respective ones of the lines 12. The addresses on the lines 90 and 92 are generally different for efficient data flow in the downstream and upstream directions, but they can be the same for example for loopback testing of a slave modem 32. To provide different logical buffers for frames in the buffers 74 and 76 associated with the respective lines 12, the buffers 74 and 76 are also addressed via the address lines 90 and 92 respectively. A store 94 is also addressed with the upstream multiplexer address on the lines 92 to provide to the demodulator 88 stored data, such as echo coefficients and signal amplitude level, relating to the respective line 12 to facilitate fast acquisition (recognition of the preamble of a frame) by the demodulator 88. A store 95 is similarly addressed with the downstream demultiplexer address on the lines 90 to provide to the modulator 78 stored data to determine a signal transmission level and possibly frequency characteristics for the respective line 12. Information for the stores 94 and 95 is determined, and the stores are updated, by the control unit 72 in known manner. Control lines 96 and 98 are provided between the control unit 72 and the modulator 78 and demodulator 88 respectively for communicating control information.

Figure 8:
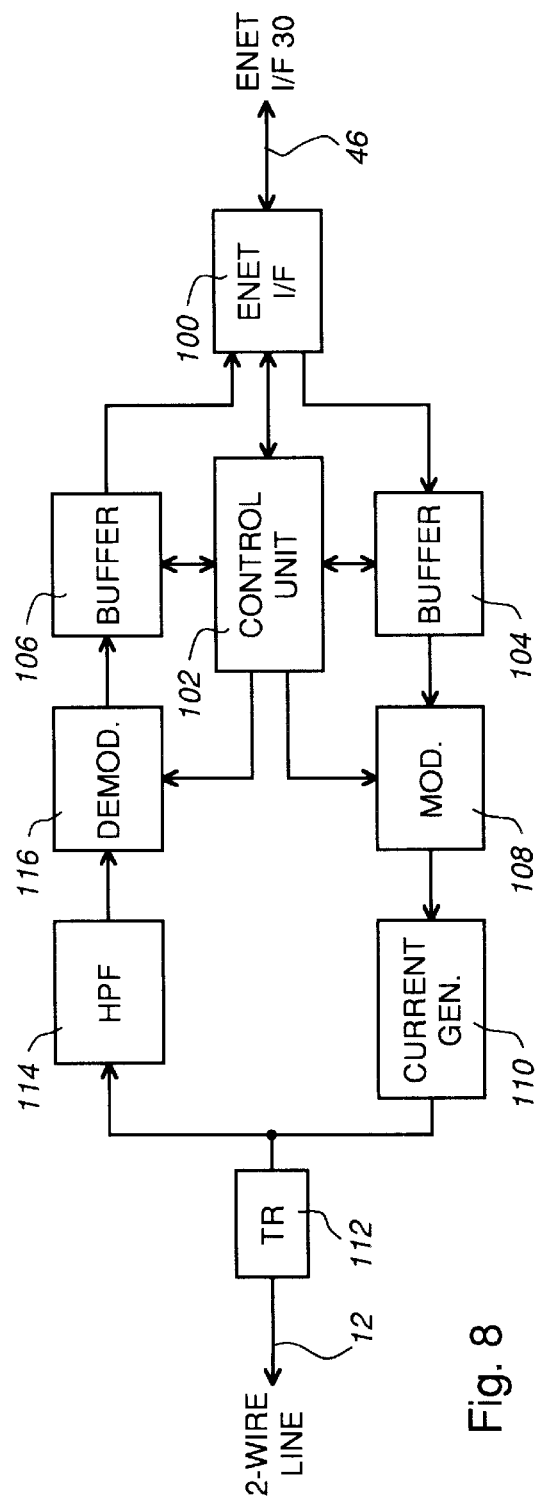
FIG. 8 schematically illustrates a slave modem provided in the Network access arrangements of FIGS. 3 and 4.

FIG. 8 illustrates a complementary form of a slave modem 32. The slave modem includes an Ethernet interface 100 of known form providing a 10BASE-T connection to the twisted pair wiring 46 and providing (for example from a read-only memory within the interface 100) a Network address for the slave modem. The interface 100 is connected to a control unit 102 of the slave modem, to the input of a FIFO buffer 104 for buffering upstream Ethernet frames supplied from the TD via the wiring 46 and the interface 100, and to the output of a FIFO buffer 106 for supplying downstream Ethernet frames via the interface 100 and the wiring 46 to the TD. An output of the buffer 104 is coupled via a modulator 108, a current generator 110, and an isolating transformer 112 to the two-wire line 12. The transformer 112, which can also provide a balun function for the balanced line 12, is also coupled via a high pass filter 114 and a demodulator 116 to an input of the buffer 106. The current generator 110 provides a high output impedance to avoid loading of the line 12, and the HPF 114 provides a matched termination of the line 12, so that these can both be connected to the line 12 without any switching. This enables loopback testing of the line 12 from the control unit 102. Control lines are provided between the control unit 102 and the buffers 104 and 106, modulator 108, and demodulator 116.

It can be appreciated that, apart from the functions related to the multiplexing and switching for a plurality of lines 12, and the operation of the modems as described below, the master modem 34 and the slave modem 32 are similar, and the arrangement of the slave modem shown in FIG. 8 could also be used as a master modem for a single line 12.

In each of the modems 32 and 34 the modulator; demodulator, and related functions are conveniently implemented in known manner using one or more DSPs (digital signal processors) with analog-digital conversion in known manner. DSPs can be conveniently controlled to provide an arbitrary number of different signal bandwidths for example as illustrated by the spectra 62 and 64 in FIG. 6. Conveniently the DSPs provide a common lower frequency limit of about 10 kHz for all of the signal bandwidths as shown in FIG. 6, with the different bandwidths being determined by the symbol or clock rate as described above. The particular modulation method that is used is relatively arbitrary, but conveniently the DSPs in the modems are programmed to select any of a plurality of modulation methods, for example 16QAM (quadrature amplitude modulation), QPSK (quadrature phase shift keying), and BPSK (binary phase shift keying), providing different numbers of bits per symbol. These particular methods and numbers are given only by way of example, and other modulation methods, such as VSB (vestigial sideband), carrierless amplitude-phase, and DMT (discrete multi-tone) modulation, may be used instead, numerous different numbers of bits per symbol may be used, and the signal bandwidths may be arbitrarily defined (e.g. with different low-frequency cut-offs) as desired.

The master and slave modems communicate Ethernet frames downstream (from the master modem 34 to the slave modem 32) and upstream (from the slave modem 32 to the master modem 34) in a manner described in detail below. Briefly, this communication involves half-duplex transmission using a collision avoidance protocol (ECAP) in which the master modem 34 has priority and control over the slave modem 32. Thus the master modem 34 determines when to send information downstream via the line 12, and informs the slave modem when it is permitted to send information upstream via the line 12. To facilitate these communications, the information sent via the line 12 comprises not only the data packets of Ethernet frames for Network communications but also control packets downstream and response packets upstream between the master and slave modems. These packets are incorporated into ECAP frames examples of which are described below with reference to FIGS. 9 to 11. The control units 72 and 102 in the master and slave modems perform the necessary conversions between the Ethernet frames and ECAP data frames, and generate and respond to the ECAP control and response frames.

Figure 9:
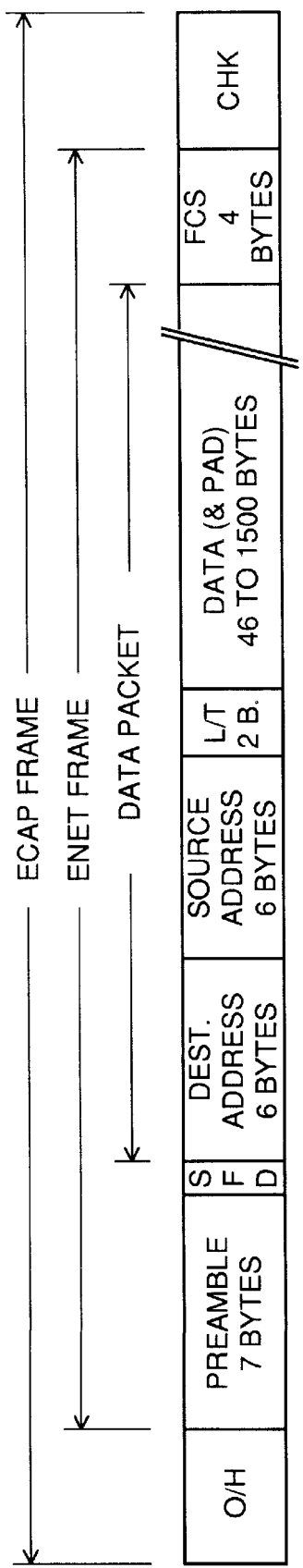
FIGS. 9 to 11 illustrate frame formats that can be used in Network access arrangements in accordance with embodiments of the invention.

FIG. 9 illustrates an ECAP data frame which comprises overhead information O/H, followed by an Ethernet frame in exactly the same form as described above with reference to FIG. 2, followed by a check sequence CHK. The O/H field for example consists of a few bytes comprising a preamble and start-of-frame (SOF) indication of a suitable form for the modulation method in use by the master and slave modems, possibly followed by other information such as an ECAP frame sequence number for frame identification in known manner (e.g. for identifying frames for acknowledgement or retransmission). The check sequence CHK conveniently comprises a CRC sequence which can be produced in exactly the same manner as the FCS field of the Ethernet frame, the CRC operating on all of the information in the ECAP frame following the SOF indication up to and including the FCS at the end of the Ethernet frame. Thus as shown in FIG. 9 the Ethernet frame is enveloped, intact and without any change, within the ECAP frame.

Figure 10:
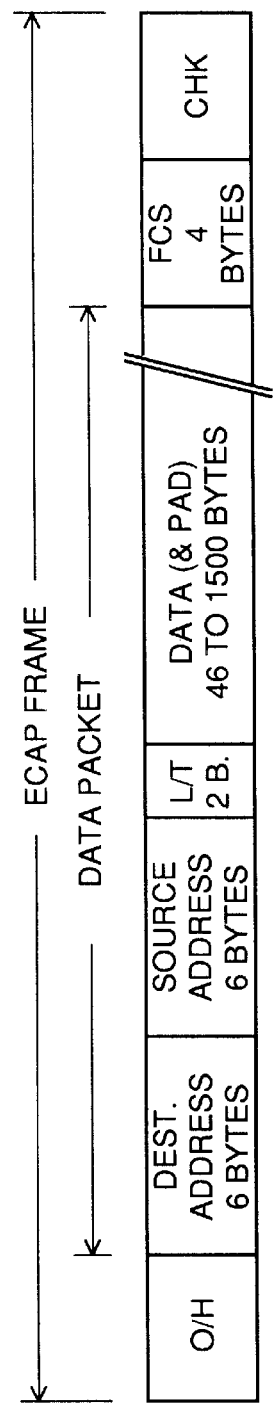

Alternatively, as illustrated in FIG. 10, the preamble and SFD fields can be stripped from the Ethernet frame and only the remainder of the Ethernet frame (i.e. the data packet and FCS field) incorporated into the ECAP frame between the overhead field O/H and the check sequence CHK. In this case the preamble and SFD fields of the Ethernet frame are stripped for example by the control unit of whichever of the master and slave modems 34 and 32 is sending the frame, and is reinserted by the control unit of the receiving one of the modems 34 and 32 for forwarding the Ethernet frame to the respective Ethernet interface. This reduces slightly the amount of information to be transmitted via the line 12. Further reductions are possible if for example the pad, used for increasing data packets of less than 46 bytes to the minimum data field size of an Ethernet frame, can also be identified, stripped prior to sending the remainder of the frame between the modems 34 and 32, and reinserted at the receiving modem. However, it may be more desirable for the modems 34 and 32 always to communicate the entire data packet and FCS field of each Ethernet frame intact, to avoid risk of corrupting the Ethernet frame contents.

Thus whereas transmission of undersized frames is not possible in a CSMA/CD arrangement because of the nature of the contention scheme (they are generally interpreted as collisions), in this ECAP scheme collisions are avoided by the protocol between the master and slave modems so that short frames are not only permitted but can be desirable because they reduce the amount of information that must be communicated via the line 12.

Figure 11:
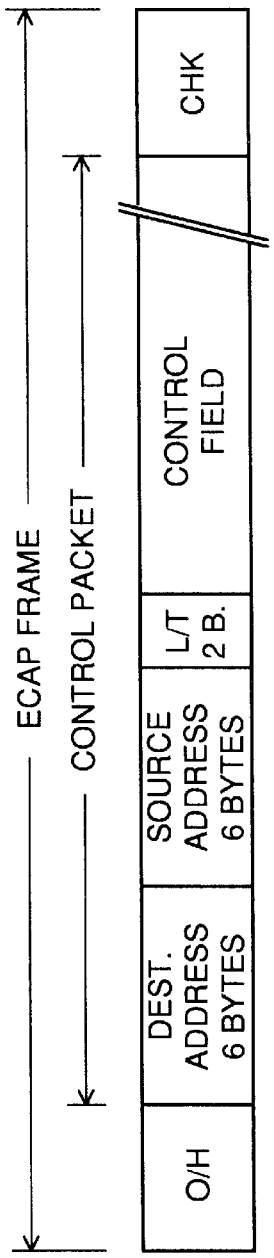

To this end, FIG. 11 illustrates an ECAP control frame comprising a control packet to be communicated from the master modem 34 to the slave modem 32. The control frame comprises an initial overhead field O/H as described above, followed by a control packet described below, and the check field CHK providing a CRC sequence for all of the information in the ECAP frame following the SOF indication up to the end of the control packet. The control packet comprises destination and source address fields, a length/type field L/T, and a control field which is generally much shorter than the minimum 46 byte data field of an Ethernet frame and whose length is given by the contents of the field L/T. For such a control packet the destination and source addresses are the Network addresses of the slave modem 32 and the master modem 34, respectively.

Conversely, an ECAP response frame can have the same form as the control frame shown in FIG. 11, except that it contains a response field instead of the control field and the destination and source addresses are exchanged because the response frame is communicated from the slave modem 32 to the master modem 34.

Other ECAP frame formats can alternatively be provided to suit particular situations; for example for convenience or simplicity the control and response frames can have a fixed size and can be the same size as a data frame containing a minimum-size data packet. In addition, although as described here by way of example the control frames are separate from the data frames, control information can instead be incorporated into the ECAP data frames, desirably keeping the enveloped Ethernet frame contents intact, for example as an additional part of the overhead field O/H or between the CRC fields FCS and CHK.

Figure 12:
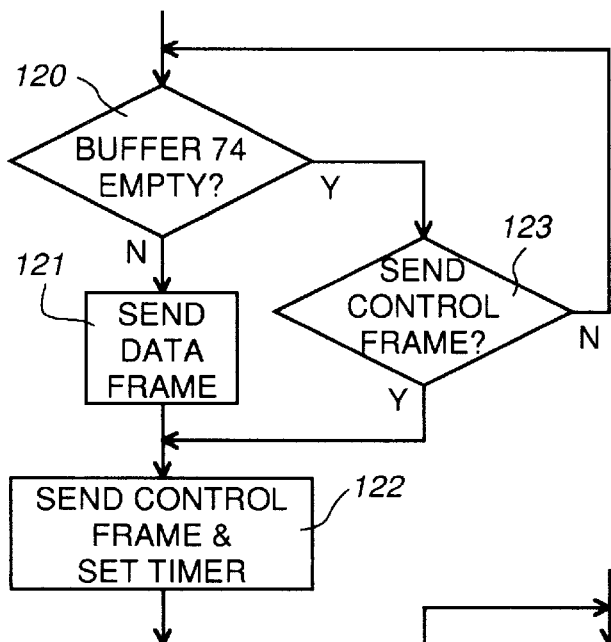
FIGS. 12 to 14 are flow charts with reference to which operation of the master and slave modems is described.
Figure 13:
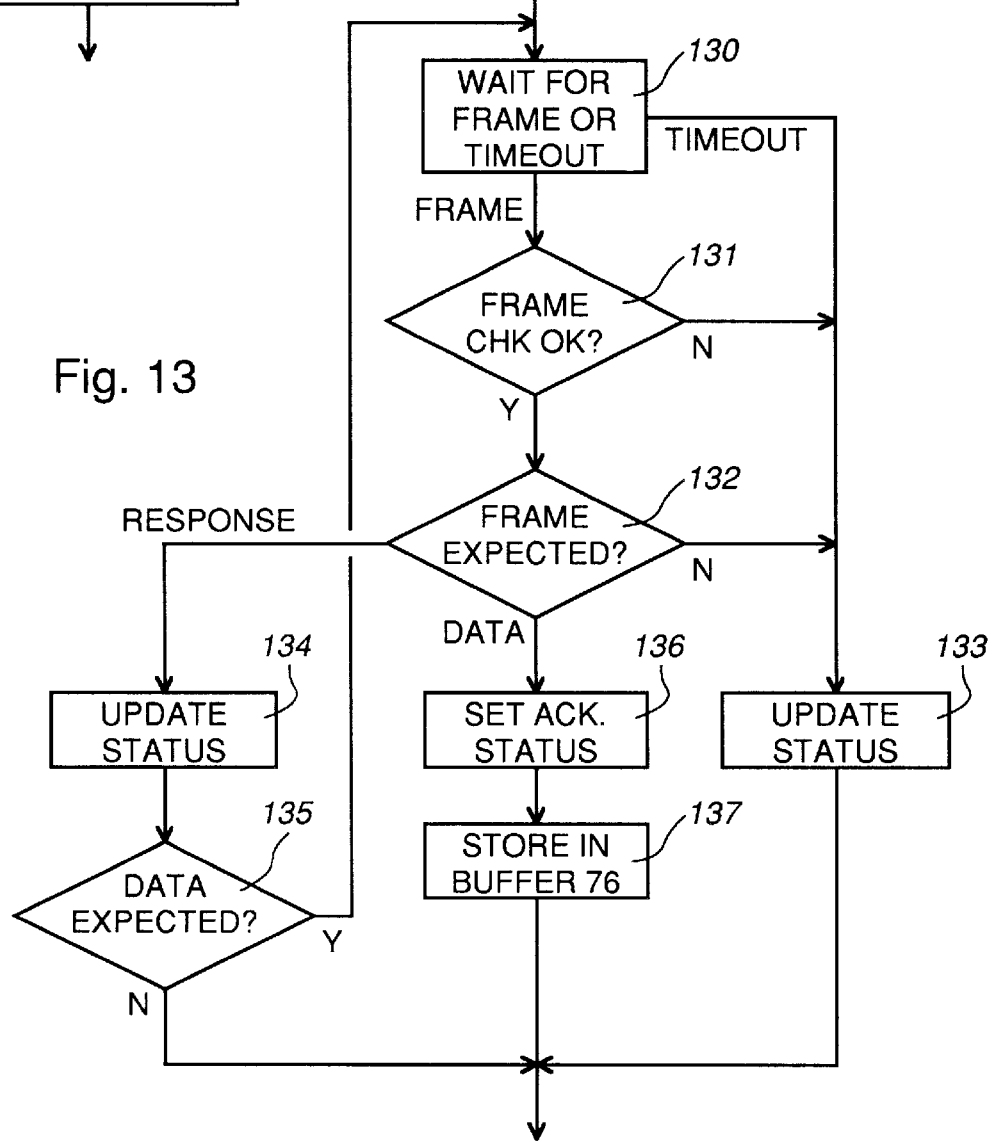
Figure 14:
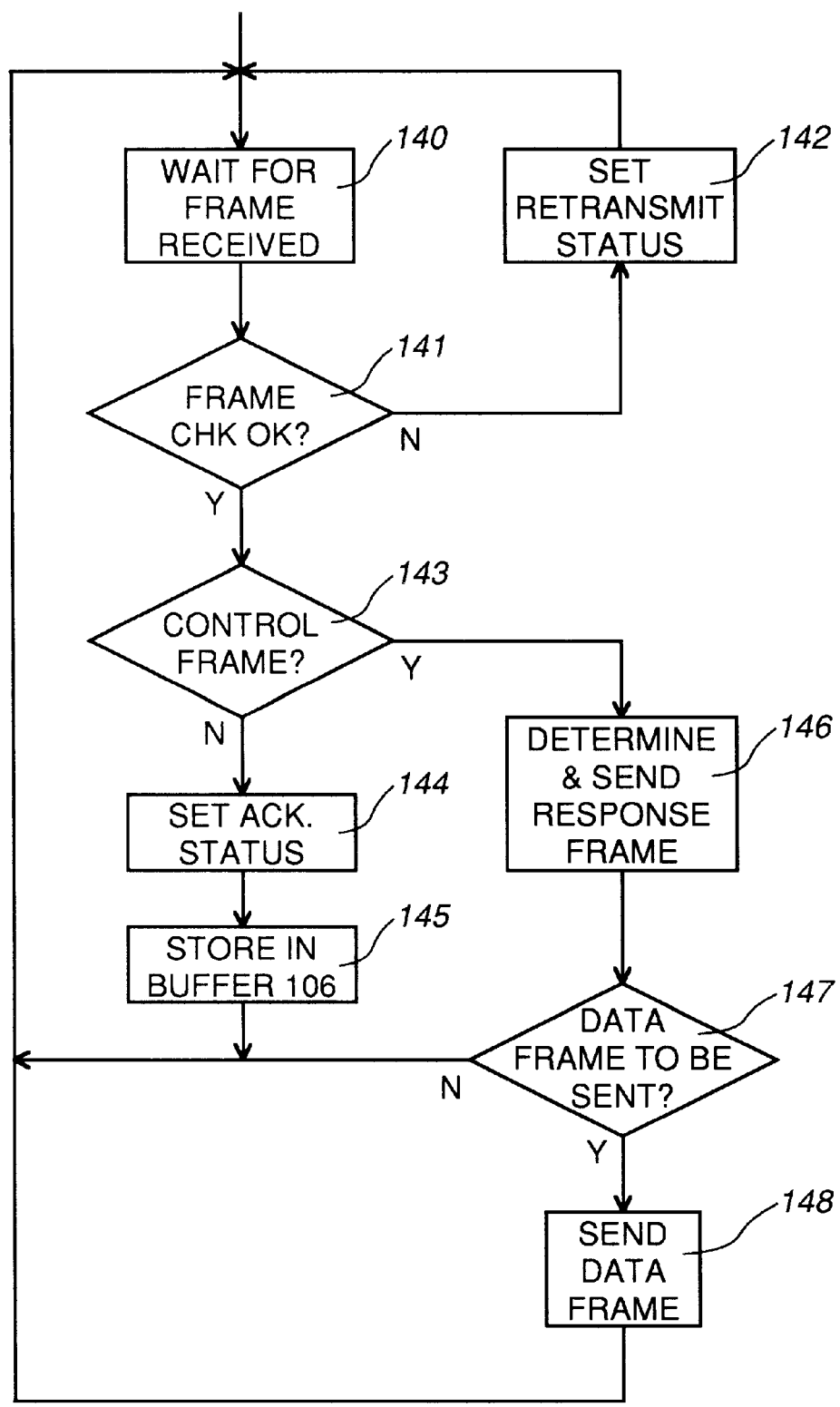

The following description of an example of the collision avoidance protocol, with reference to FIGS. 12 to 14, assumes for simplicity and clarity that the master modem 34 typically sends a single data frame followed by a control frame downstream, and then waits for a response from the slave modem 32, and that the slave modem waits for these downstream frames and then typically sends a response frame followed by a single data frame upstream. It also assumes for simplicity that there is only one slave modem 32 connected to the line 12. Various modifications and extensions of this protocol, for example to accommodate multiple slave modems 32 connected to the same line 12, can be contemplated and some variations are described later below.

FIG. 12 illustrates a downstream transmitting flow chart for the master modem 34, and FIG. 13 illustrates an upstream receiving flow chart for the master modem 34, the master modem 34 being assumed here simply to alternate between the transmitting and receiving states for communications with a single slave modem 32. As already described, the master modem 34 can provide multiplexed operations for a plurality of slave modems, so that in practice the transmitting and receiving processes can take place simultaneously and independently in a multiplexed manner for a plurality of slave modems. FIG. 14 illustrates a downstream receiving and upstream transmitting flow chart for the slave modem 32. The operations in the modems in each case take place under the control of the respective control unit 72 or 102, and the master and slave modems differ in the manner in which these units operate as described below.

Referring to FIG. 12, in the transmitting sequence of the master modem 34 its control unit 72 initially determines in a decision 120 whether the downstream buffer 74 (for the respective line 12 and slave modem 32) is empty. If not, i.e. if there is at least one Ethernet frame to be sent from the buffer 74, then at a block 121 the next frame to be sent downstream from the buffer 74 is transmitted in an ECAP data frame as described above. At a block 122 the control unit 72 then sends a control frame as described above, and sets a timer for a response from the slave unit. In the event that the buffer 74 is empty as determined in the decision 120, then in a decision 123 the control unit 72 determines whether or not to send a control frame, if so proceeds to the block 122 to send a control frame, and if not returns to the start of the transmitting sequence. The decision 123 whether or not to send a control frame may depend upon various parameters which are monitored by the control unit 72, such as the fill state of the upstream receiving buffer 76, the state of the slave modem and the fill state of its upstream transmitting buffer 104, and the time since the previous control frame was sent to the slave modem. The contents of the control frame can comprise, for example, a request (poll) for the slave modem to transmit a frame of data upstream, a request for retransmission by the slave modem of a previous frame that has not been received correctly as determined by its check field CHK, control information such as operating parameters for the slave modem, and/or a request for status information, such as the fills of the buffers 104 and 106, from the slave modem.

Referring now to FIG. 14, at a block 140 the control unit 102 of the slave modem 32 initially waits for a frame to be received from the master modem 34. This waiting, and the subsequent operation of the slave modem in response to a received frame and operation of the master modem, ensures that collisions on the line 12 are avoided by giving control of the ECAP frames on the line 12 entirely to the master modem 34. In response to receipt of a downstream frame from the master modem 34, the control unit 102 of the slave modem determines in a decision 141 from the field CHK whether the frame has been received properly and, if not, at a block 142 sets a status flag to request retransmission of the frame and returns to the wait block 140. If the frame has been properly received the control unit 102 proceeds to a decision 143.

In the decision 143 the control unit 102 determines whether or not the destination address in the received frame is the address of the slave modem, and hence whether the frame is a control frame or a data frame. If the frame is determined to be a data frame, then in a block 144 the control unit 102 sets a status flag for acknowledgement of the frame, and in a block 145 the data frame is stored in the buffer 106 and a return is made to the wait block 140.

If in the decision 143 the frame is determined to be a control frame, then in a block 146 the control unit 102 generates and sends a response frame upstream to the master modem. The contents of the response frame depend on the nature of the received control frame and the status of the slave modem, but for example can include status information, an acknowledgement of the received data frame (based on the acknowledgement status flag), a request for retransmission of an incorrectly received frame (based on the retransmission status flag), and buffer fills of the buffers 104 and 106. In a decision 147, the control unit 102 then determines whether a data frame is to be sent upstream, i.e. whether the received downstream control frame included a retransmission request or a poll for an upstream data frame and such a data frame is available in the upstream transmission buffer 104. If so, at a block 148 the control unit 102 sends the requested data frame from this buffer 104 upstream to the master modem. After the block 148, or if no upstream frame is to be sent as determined in the decision 147, a return is made to the wait block 140.

Referring now to FIG. 13, after the downstream transmitting sequence described above with reference to FIG. 12 the control unit 72 in the master modem 34 waits, as shown by a block 130, for an upstream frame to be received or for the timer (set at block 122) to time out. If an upstream frame is received, then in a decision 131 the control unit 72 determines from the field CHK whether the frame has been received properly and, if so, proceeds to a decision 132. In the event that the timer times out in the block 130 or the frame is incorrectly received as determined in the decision 131, then in a block 133 the control unit 72 updates a record of the communications status of the master modem with the slave modem. This status record contains various parameters of the communications such as those already discussed, for example the status of acknowledgements and retransmission requests, buffer fills, and operating parameters of the modems.

In the decision 132 the control unit determines, from the destination address of the received upstream frame and in accordance with its expectations based on the status of the communications, whether this is a response frame (i.e. the destination address is the address of the master modem) as expected first from the slave modem, or a data frame for which a poll or retransmission request has been sent to the slave modem as described above, or whether the frame does not have the expected form (e.g. it is a data frame when a response frame is expected). In the latter case the communications status is updated in the block 133, and the control unit 72 proceeds in a manner dependent upon the updated status. For example, from the block 133 the control unit returns from the upstream receiving sequence of FIG. 13 to the downstream transmitting sequence of FIG. 12, and can send a control frame requesting retransmission of an upstream frame for which there has been a timeout from the block 130, a CRC error as determined in the decision 131, or an unexpected frame as determined in the decision 132.

On receipt of an expected response frame, in a block 134 the communications status is updated accordingly, and in dependence upon a decision 135 either a return is made to the block 130 for a data frame expected following the response frame (a data frame is expected if it has been requested from the slave modem and the response frame has not indicated that the upstream transmitting buffer 104 is empty; the timer for the block 130 can be reset as desired) or the receiving sequence ends if no subsequent data frame is expected. On receipt of an expected data frame as determined in the decision 132, in a block 136 the control unit 72 sets a status flag for acknowledgement of the frame, and in a subsequent block 137 the received data frame is stored in the upstream receiving buffer 76 and the receiving sequence ends. As already described above, at the end of the upstream receiving sequence the control unit 72 of the master modem 34 returns to the start of the downstream transmitting sequence already described.

The collision avoidance protocol as described above provides for an approximate one-to-one ratio of downstream and upstream Ethernet frames, and gives priority to the master modem and the transmission of downstream frames. This is desirable because the modem arrangement has no control over the supply from the Network of Ethernet frames incoming to the buffer 74, and it is desirable to avoid overflow of this buffer which would result in a loss of data frames. Such a data frame loss can be accommodated by the TCP/IP operating at Layers 3 and 4 of the OSI model, but this is preferably avoided.

The same principles apply for upstream Ethernet frames incoming to the buffer 104 from the TD 14, but in this case overflow of the buffer 104 can be prevented by the Ethernet interface 100 of the slave modem 32, under the control of the control unit 102 in the event that the buffer 104 is about to overflow, jamming the 10BASE-T connection on the wiring 46 by transmitting a dummy signal to it. As discussed in the introduction, jamming is a well-known process for ensuring that a collision detected at one device on a CSMA/CD LAN is also detected by all other devices on the LAN, but in this case the jamming is triggered differently, by the potential overflow of the buffer 104. The jam or artificially created collision on the wiring 46 is detected by the TD 14 connected to this wiring, and the TD backs off for subsequent retransmission of the Ethernet frame in known manner. In this manner, a loss of upstream data frames due to overflow of the buffer 104 is avoided. The same situation can take place in the event that the wiring 46 is connected to the bridge 48 on a subscriber LAN as described with reference to FIG. 3, but in this case either the bridge 48 must be a learning bridge to avoid passing to the slave modem 32 via the wiring 46 subscriber LAN frames not intended for upstream transmission, or such a learning function must be incorporated into the slave modem itself, otherwise jamming of all frames on the subscriber LAN will occur when the buffer 104 is about to overflow.

To reduce the possibility of buffer overflow, especially of the buffer 74, the collision avoidance protocol described above can provide dynamic variation of the ratio of the numbers of downstream and upstream frames, for example in dependence upon the fills of the buffers. The buffer fills are monitored as described above by the control unit 72, either directly in the case of the master modem 34 or via status information in response frames from the slave modem 32. If the fill of the buffer 74 is increasing, then the master modem can simply send a plurality of data frames downstream instead of each single data frame as described above with reference to FIG. 12, before sending the control frame to poll the slave modem for an upstream data frame, thereby increasing the downstream to upstream data frame ratio. Conversely, if the buffer 74 is relatively empty and the buffer 104 is relatively full, the master modem can provide repeated polls for single upstream data frames without sending downstream data frames using the protocol exactly as described above, or more desirably the ECAP control frame poll can be arranged to indicate to the slave modem a number of data frames that it is requested to transmit upstream in response to particular polls, with the slave modem responding accordingly.

It can be appreciated from the description above that the collision avoidance protocol ensures that the modems 34 and 32 operate in a half-duplex manner for communications between them via the line 12, with the total transmission capacity of the line being shared, preferably dynamically dependent upon buffer fills as described above, between the downstream and upstream directions of transmission. The protocol can be refined, from its basic form as described above, in various ways to maximize the efficiency with which the total transmission capacity is used. For example, such refinements can include provisions for sending multiple data frames successively in either direction as described above, concatenating or merging control and/or data frames sent in the same direction, and advancing the timing of downstream frame transmission from the master modem in view of the loop delay on the line 12 (which can be measured in known manner by the master modem) and the knowledge in the master modem control unit 72 of what upstream frames are expected from the slave modem.

This total transmission capacity on the line 12 can also be varied dynamically by the master modem 34 in dependence upon monitored operating conditions, as explained further below.

As described above, the modulation and demodulation functions in the master and slave modems are desirably implemented using DSPs. A clock rate of the DSPs can be changed to vary the signal bandwidth as shown by the two different spectra 62 and 64 in FIG. 6. A high clock rate provides a corresponding large bandwidth, for example as shown by the spectrum 62 in FIG. 6, providing a high symbol transmission rate on the line 12 between the modems 34 and 32. However, this involves greater susceptibility to noise (a large noise bandwidth) and greater signal attenuation (which is dependent on frequency). Conversely, a lower clock rate provides a smaller bandwidth, for example as shown by the spectrum 64 in FIG. 6, providing a lower symbol transmission rate on the line 12 with less susceptibility to noise and less signal attenuation. Considered generally, higher symbol rates on the line 12 produce greater total transmission capacity and greater error rates, resulting in frames having to be retransmitted.

As also described above, the control unit 72 in the master modem 34 determines from the check field CHK of each received upstream frame whether the frame has been received correctly, and can monitor a proportion of correct upstream frames received. The control unit 72 can similarly monitor a proportion of correct downstream frames received by the slave modem 32 from information similarly available in the control unit 102 of the slave modem and communicated to the control unit 72 via the response frames. From such ongoing monitoring, the control unit 72 can determine dynamically whether the clock rate in current use for the DSPs is appropriate or should desirably be increased to increase the total transmission capacity on the line 12 or decreased to decrease the proportion of frames received in error. This can be determined either independently or in common for the upstream and downstream directions of transmission.

For example, if the control unit determines that a high proportion, more than an upper threshold value of for example 95 to 99%, of frames are received correctly, then it can decide to increase the DSP clock rate and hence the total transmission capacity. To this end it generates a control frame which is sent from the master modem to the slave modem instructing the slave modem to adopt a new, higher, clock rate for future frames, the slave modem responds accordingly, and the master modem switches its own clock rate. Conversely, if the control unit determines that a low proportion, less than a lower threshold value of for example 50 to 75%, of frames are received correctly, then it can decide to decrease the DSP clock rate to reduce errors. To this end it generates a control frame which is sent from the master modem to the slave modem instructing the slave modem to adopt a new, lower, clock rate for future frames, the slave modem responds accordingly, and the master modem switches its own clock rate. It can be appreciated that the threshold levels can be determined to provide a desired hysteresis for changing the clock rate, and that they may be adaptively adjusted by the control unit 72 in dependence upon the results of previous changes in clock rate.

The total transmission capacity is determined not only by the symbol transmission rate on the line 12 but also by the number of bits per symbol, and hence by the modulation method that is used. As described above, the modem DSPs can provide any of a plurality of modulation methods, such as 16QAM, QPSK, and BPSK providing respectively 4 bits, 2 bits, and 1 bit per transmitted symbol. In a similar manner to that described above for dynamically varying the symbol transmission rate, the control unit 72 can also or instead dynamically vary the modulation method. A determination as to whether to change the symbol transmission rate and/or the modulation method can be made by the control unit 72 in dependence upon various parameters such as the current symbol transmission rate and modulation method, a history of these operating parameters, the error rate, and monitored characteristics of the line 12 such as delay, signal levels, and echo parameters.

In any event, the dynamic variations discussed above enable the control unit 72 in the master modem 34 to determine and use, at any particular time for any particular line 12 to which it is connected, a clock rate and modulation method to provide an optimal total transmission capacity on that line. It can be appreciated that this optimal capacity may well include a certain proportion of frames that are in error and must be retransmitted, and that this is accommodated by the collision avoidance protocol as already described above.

The total transmission capacity can vary over an extremely wide range. For example, for a short line 12 and under good conditions, the modulation method may be 16QAM and the clock rate 3 MHz to provide a total transmission capacity of the order of the 10BASE-T bit rate of 10 Mb/s. Conversely, for a long line 12 (it is observed here that the line 12 must be unloaded to permit communication of signals at frequencies above the voice-band) and in poor conditions (e.g. in the presence of noise and crosstalk) the modulation method may be BPSK and the clock rate may be reduced to for example 30 kHz, thereby providing a total transmission capacity of about 25 kb/s (at for example 0.85 bits per Hertz to allow for excess bandwidth of the modem filters). However, it is noted that even this total transmission capacity is commensurate with the maximum bit rates of dial-up modems currently used to provide Network connections via conventional two-wire telephone lines. In practice, the total transmission capacity provided will be between these extremes, and will generally be substantially more than can be provided by currently used dial-up modems or on ISDN telephone lines.

It is also noted that the master modem 34 can be arranged to fall back to known modem communications methods in the event that it does not receive any ECAP response frames from a slave modem, so that the same master modem can operate alternatively with slave modems as described above or with conventional modems.

In use of the network access arrangement and protocol as described above, the master and slave modems and the line 12 simply serve to communicate Ethernet frames in both directions transparently between the wiring 36 and 46. Accordingly, the subscriber is provided with a Network connection without any dialling process, and hence without involving a telephone connection via the PSTN, in the same way (as seen by the Network and by the subscriber) as if the wiring 36 and 46 were directly interconnected. As described above, this Network connection is established in a manner that is dynamically variable to provide an optimum total transmission capacity, which can be shared in a dynamically variable and optimized ratio of upstream to downstream data frames, for any prevailing conditions such as the characteristics of the line 12 and noise and crosstalk levels. For short lines 12, the total transmission capacity is comparable with the bit rate of 10BASE-T LANS, so that there is no inherent deterioration of performance for communication of Ethernet frames. In addition, it is observed that because the frames on the line 12 are communicated in burst mode, there is statistically less energy on the line than would be the case for continuous data transmission on the same line, so that crosstalk with other lines in the same cable is reduced. Furthermore, the same line 12 can simultaneously carry conventional telephone signals, so that provision of the network access arrangement to a telephone subscriber does not necessitate the provision of an additional or separate telephone line.

Thus the use of the network access arrangement from a TD 14 is substantially the same as if the TD 14 were connected directly via an Ethernet interface to the Ethernet switch 38. The TD 14 runs conventional software which, for initial access to the Network, in known manner sends information packets in Ethernet frames upstream, these packets containing for example the Network address of the management device 42 as the destination address and the Network address of the TD 14 as the source address. The packets are routed via the Ethernet switch 38 in known manner to the device 42, and the switch 38 stores the address of the TD 14 for subsequent direction of Ethernet frames addressed to this address to this TD. In known manner, the device 42 either recognizes the source address of the TD 14 and provides a welcome message, or does not recognize it and initiates a registration process, and communications continue in known manner except that they take place via the modems 34 and 32 and line 12 instead of via a direct connection as is known.

In the embodiments described in detail above and as illustrated in FIG. 3 the slave modem 32 is separate from the Ethernet interface 30 connected to the TD 14 and includes its own Ethernet interface and Network address. While this is convenient in the case that the slave modem is connected to a subscriber LAN via the wiring 46, it can be superfluous or undesirable in the event that the slave modem 32 is connected to only a single TD 14, especially if the slave modem 32 and Ethernet interface 30 are merged together into a combined unit that may be incorporated into the TD 14 as would be desirable for example for an entertainment device. Even in the case of a subscriber LAN, the bridge 48 can be considered as a terminal device in which the slave modem 32 could be incorporated.

It can be seen, therefore, that the manner in which the slave modem 32 is ultimately connected to the TD 14 is relatively arbitrary as far as this invention is concerned, it only being necessary that the information be converted or translated between the Ethernet frames to and from the buffers 104 and 106 of the slave modem and whatever form is required for the connection to the TD 14 (for example, a PCM/CIA interface of known form), and that a Network address identify the TD, translator, and/or slave modem. Desirably, the slave modem 32 and the Ethernet interface 30 are merged into a combined unit, which can have a form for example as illustrated in FIG. 15.

Figure 15:
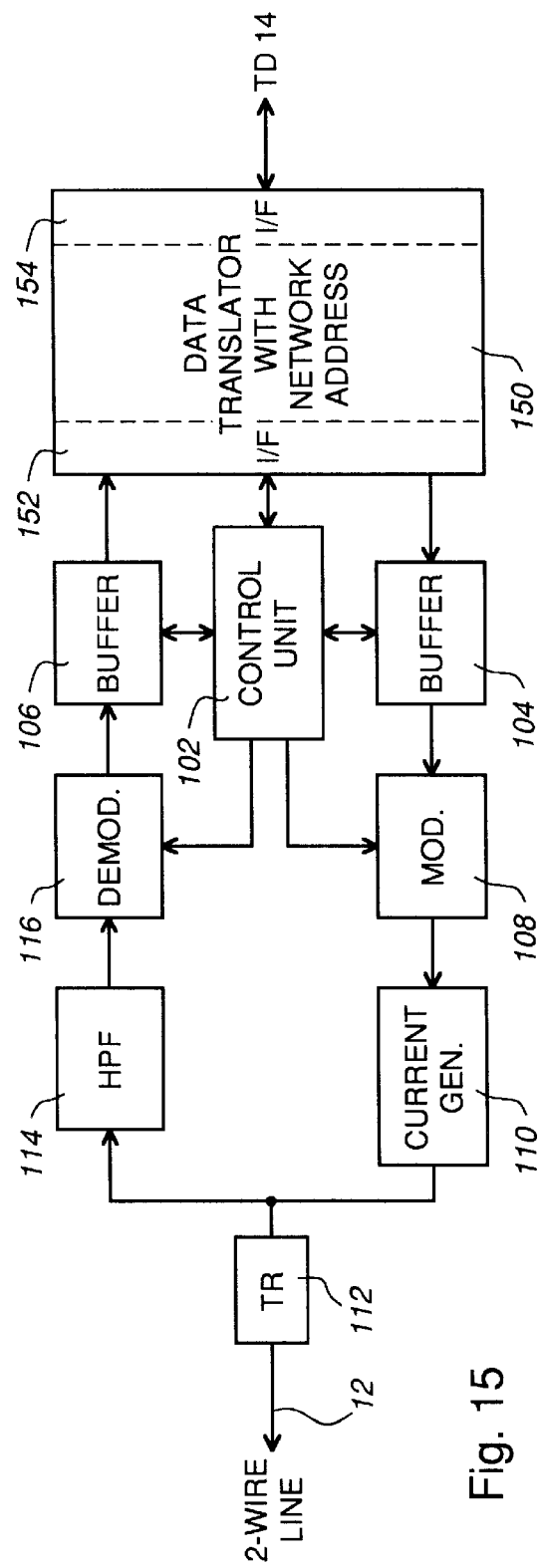
FIG. 15, which is on the same sheet as FIG. 8, schematically illustrates a combined unit which replaces a slave modem and Ethernet interface provided in the arrangement of FIG. 3.

Referring to FIG. 15, the combined unit has a similar form and operation to the slave modem 32 as described above with reference to FIG. 8, and the same reference numerals are used to denote similar parts, except that the Ethernet interface 100 and wiring 46 of the slave modem of FIG. 8, as well as the Ethernet interface 30 of FIG. 3, are replaced by a data translator 150. The translator 150 has an interface 152 to the control unit 102 and buffers 104 and 106, and an interface 154 to the TD 14, which are arranged and operate in the same manner as the corresponding parts of the known Ethernet interfaces 100 and 30 discussed above. Between these interfaces 152 and 154, the unit 150 includes a minimized subset of the known circuits and functions of the Ethernet interfaces 100 and 30 necessary to translate data between the TD interface 154 and the Ethernet frame buffers 104 and 106, and to provide a single Network address. This avoids the disadvantage of needing two Network addresses for the slave modem 32 and the Ethernet interface 30 respectively as in the embodiments of the invention described above, but makes it necessary to distinguish between ECAP control frames for the control unit 102 and ECAP data frames enveloping Ethernet frames containing data for the TD 14.

Where the control frames and data frames are separate ECAP frames, this distinction can conveniently be provided by using the L/T field of the Ethernet frame. For an ECAP control frame, the L/T field can contain a pre-assigned (and otherwise unused) type having a value greater than the maximum value of 1500 for an Ethernet frame, which is recognized by the control unit 102 so that the control frame is not forwarded to the translator 150. Alternatively, or in addition, as described above ECAP control information can be appended to Ethernet frames, for example in the overhead field O/H or between the FCS field of the enveloped Ethernet frame and the check field CHK of the ECAP frame. In either case the control information can be of a fixed size or it can include its own length field to indicate its size. The L/T field of the enveloped Ethernet frame is not changed, to avoid any risk of corrupting the Ethernet frame.

Although particular embodiments of the invention and various modifications have been described in detail, it should be appreciated that numerous other modifications, variations, and adaptations may be made without departing from the scope of the invention as defined in the claims.

What is claimed is:

1. A method of providing communications with a CSMA/CD (Carrier Sense Multiple Access with Collision Detection) network via a bidirectional communications path, comprising the steps of:

at a first end of the communications path, providing a CSMA/CD interface to the network, buffering information packets received from the network via the interface in a first buffer, supplying information packets from the first buffer to the communications path, and supplying control information to the communications path;

at a second end of the communications path, buffering information packets received via the communications path in a second buffer, receiving the control information from the communications path, buffering information packets to be supplied via the communications path to the network in a third buffer, and supplying information packets from the third buffer to the communications path in dependence upon the control information; and at the first end of the communications path, supplying information packets received via the communications path to a fourth buffer, and supplying the information packets from the fourth buffer to the network via the interface;

wherein the control information and the dependence on the control information for supplying information packets from the third buffer to the communications path are arranged to avoid collisions on the communications path between information packets communicated from the first buffer to the second buffer and information packets communicated from the third buffer to the fourth buffer.

2. A method as claimed in claim 1 and further comprising the steps of monitoring fills of at least some of the buffers, and varying a ratio of information packets communicated from the first buffer to the second buffer to information packets communicated from the third buffer to the fourth buffer in dependence upon the monitored fills.

3. A method as claimed in claim 1 wherein the steps of supplying information packets from the first buffer to the communications path and supplying information packets from the third buffer to the communications path comprise enveloping information packets in information frames, the information frames also comprising error check fields for error checking of at least the enveloped information packets.

4. A method as claimed in claim 3 wherein the step of supplying control information to the communications path comprises including control information in at least some of the information frames.

5. A method as claimed in claim 3 wherein the step of supplying control information to the communications path comprises communicating further frames, each further frame comprising control information and an error check field for error checking of at least the control information.

6. A method as claimed in claim 1 wherein each information packet communicated via the communications path comprises at least address, length, and data fields of an Ethernet frame communicated via the CSMA/CD interface.

7. A method as claimed in claim 6 wherein each information packet communicated via the communications path further comprises a frame check sequence of the respective Ethernet frame communicated via the CSMA/CD interface.

8. A method as claimed in claim 7 wherein each information packet communicated via the communications path further comprises a preamble and start frame delimiter of an Ethernet frame.

9. A method as claimed in claim 1 wherein the information packets are communicated via the communications path as modulated signals between modems at the first and second ends of the communications path.

10. A method as claimed in claim 9 and further comprising the steps of monitoring errors in communicating information packets via the communications path and varying a signal bandwidth of the modems in dependence upon the monitored errors.

11. A method as claimed in claim 9 and further comprising the steps of monitoring errors in communicating information packets via the communications path and varying a modulation method of the modems in dependence upon the monitored errors.

12. A method as claimed in claim 9 and further comprising the step of multiplexing the modem at the first end of the communications path for communicating information packets with a plurality of modems at the second ends of a plurality of respective communication paths.

13. A method as claimed in claim 9 wherein the communications path comprises a two-wire telephone subscriber line and the modems communicate said information packets via the line at frequencies greater than telephone signal frequencies, the method further comprising the steps of:

communicating telephone signals via the line; and at each end of the line, combining telephone signals and information packets to be communicated via the line, and separating telephone signals and information packets communicated via the line, using a diplexer.

14. A method as claimed in claim 13 and further comprising the step of multiplexing the modem at the first end of the communications path for communicating information packets with a plurality of modems at the second ends of a plurality of respective telephone subscriber lines.

15. A method as claimed in claim 1 and further comprising the steps of providing a second CSMA/CD interface to a CSMA/CD path at the second end of the communications path and communicating information packets between the second and third buffers and the CSMA/CD path via the second CSMA/CD interface.

16. A method as claimed in claim 15 and further comprising the step of jamming the CSMA/CD path from the second CSMA/CD interface in response to filling of the third buffer.

17. A method as claimed in claim 2 wherein the information packets are communicated via the communications path as modulated signals between modems at the first and second ends of the communications path.

18. A method as claimed in claim 17 and further comprising the steps of monitoring errors in communicating information packets via the communications path and varying a signal bandwidth of the modems in dependence upon the monitored errors.

19. A method as claimed in claim 17 and further comprising the steps of monitoring errors in communicating information packets via the communications path and varying a modulation method of the modems in dependence upon the monitored errors.

20. A method as claimed in claim 17 and further comprising the step of multiplexing the modem at the first end of the communications path for communicating information packets with a plurality of modems at the second ends of a plurality of respective communication paths.

21. A method as claimed in claim 17 wherein the communications path comprises a two-wire telephone subscriber line and the modems communicate said information packets via the line at frequencies greater than telephone signal frequencies, the method further comprising the steps of:

communicating telephone signals via the line; and at each end of the line, combining telephone signals and information packets to be communicated via the line, and separating telephone signals and information packets communicated via the line, using a diplexer.

22. A method as claimed in claim 21 and further comprising the step of multiplexing the modem at the first end of the communications path for communicating information packets with a plurality of modems at the second ends of a plurality of respective telephone subscriber lines.

23. A method as claimed in claim 18 wherein the communications path comprises a two-wire telephone subscriber line and the modems communicate said information packets via the line at frequencies greater than telephone signal frequencies, the method further comprising the steps of:

communicating telephone signals via the line; and at each end of the line, combining telephone signals and information packets to be communicated via the line, and separating telephone signals and information packets communicated via the line, using a diplexer.

24. A method as claimed in claim 23 and further comprising the step of multiplexing the modem at the first end of the communications path for communicating information packets with a plurality of modems at the second ends of a plurality of respective telephone subscriber lines.

25. A method as claimed in claim 19 wherein the communications path comprises a two-wire telephone subscriber line and the modems communicate said information packets via the line at frequencies greater than telephone signal frequencies, the method further comprising the steps of:

communicating telephone signals via the line; and at each end of the line, combining telephone signals and information packets to be communicated via the line, and separating telephone signals and information packets communicated via the line, using a diplexer.

26. A method as claimed in claim 25 and further comprising the step of multiplexing the modem at the first end of the communications path for communicating information packets with a plurality of modems at the second ends of a plurality of respective telephone subscriber lines.

27. A method as claimed in claim 2 and further comprising the steps of providing a second CSMA/CD interface to a CSMA/CD path at the second end of the communications path and communicating information packets between the second and third buffers and the CSMA/CD path via the second CSMA/CD interface.

28. A method as claimed in claim 3 and further comprising the steps of providing a second CSMA/CD interface to a CSMA/CD path at the second end of the communications path and communicating information packets between the second and third buffers and the CSMA/CD path via the second CSMA/CD interface.

29. A method as claimed in claim 4 and further comprising the steps of providing a second CSMA/CD interface to a CSMA/CD path at the second end of the communications path and communicating information packets between the second and third buffers and the CSMA/CD path via the second CSMA/CD interface.

30. A method as claimed in claim 5 and further comprising the steps of providing a second CSMA/CD interface to a CSMA/CD path at the second end of the communications path and communicating information packets between the second and third buffers and the CSMA/CD path via the second CSMA/CD interface.

31. A method as claimed in claim 6 and further comprising the steps of providing a second CSMA/CD interface to a CSMA/CD path at the second end of the communications path and communicating information packets between the second and third buffers and the CSMA/CD path via the second CSMA/CD interface.

32. A method as claimed in claim 7 and further comprising the steps of providing a second CSMA/CD interface to a CSMA/CD path at the second end of the communications path and communicating information packets between the second and third buffers and the CSMA/CD path via the second CSMA/CD interface.

33. A method as claimed in claim 8 and further comprising the steps of providing a second CSMA/CD interface to a CSMA/CD path at the second end of the communications path and communicating information packets between the second and third buffers and the CSMA/CD path via the second CSMA/CD interface.

34. A method as claimed in claim 9 and further comprising the steps of providing a second CSMA/CD interface to a CSMA/CD path at the second end of the communications path and communicating information packets between the second and third buffers and the CSMA/CD path via the second CSMA/CD interface.

35. A method as claimed in claim 10 and further comprising the steps of providing a second CSMA/CD interface to a CSMA/CD path at the second end of the communications path and communicating information packets between the second and third buffers and the CSMA/CD path via the second CSMA/CD interface.

36. A method as claimed in claim 11 and further comprising the steps of providing a second CSMA/CD interface to a CSMA/CD path at the second end of the communications path and communicating information packets between the second and third buffers and the CSMA/CD path via the second CSMA/CD interface.

37. A method as claimed in claim 12 and further comprising the steps of providing a second CSMA/CD interface to a CSMA/CD path at the second end of the communications path and communicating information packets between the second and third buffers and the CSMA/CD path via the second CSMA/CD interface.

38. A method as claimed in claim 13 and further comprising the steps of providing a second CSMA/CD interface to a CSMA/CD path at the second end of the communications path and communicating information packets between the second and third buffers and the CSMA/CD path via the second CSMA/CD interface.

39. A method as claimed in claim 14 and further comprising the steps of providing a second CSMA/CD interface to a CSMA/CD path at the second end of the communications path and communicating information packets between the second and third buffers and the CSMA/CD path via the second CSMA/CD interface.

40. A method as claimed in claim 17 and further comprising the steps of providing a second CSMA/CD interface to a CSMA/CD path at the second end of the communications path and communicating information packets between the second and third buffers and the CSMA/CD path via the second CSMA/CD interface.

41. A method as claimed in claim 21 and further comprising the steps of providing a second CSMA/CD interface to a CSMA/CD path at the second end of the communications path and communicating information packets between the second and third buffers and the CSMA/CD path via the second CSMA/CD interface.

42. A method of coupling a terminal device to a CSMA/CD (Carrier Sense Multiple Access with Collision Detection) network via a two-wire telephone subscriber line, comprising the steps of:

coupling a first end of the line to the network via a first modem including a CSMA/CD interface to the network;

coupling a second end of the line to the terminal device via a second modem including an interface to the terminal device;

communicating information packets downstream from the network to the terminal device via the CSMA/CD interface, first modem, line, second modem, and terminal device interface;

communicating control information downstream from the first modem to the second modem; and communicating information packets upstream from the terminal device to the network via the terminal device interface, second modem, line, first modem, and CSMA/CD interface under control of the control information at times to avoid interference with the information packets and control information communicated downstream.

43. A method as claimed in claim 42 wherein the modems communicate via the line at frequencies greater than telephone signal frequencies and the method further comprises the step of frequency diplexing telephone signals and modem communications on the line.

44. A method as claimed in claim 42 and further comprising the step of multiplexing the first modem for communications with a plurality of second modems via respective telephone subscriber lines.

45. A method as claimed in claim 42 and further comprising the steps of monitoring errors in communicating information packets between the first and second modems and varying a signal bandwidth of the modems in dependence upon monitored errors.

46. A method as claimed in claim 42 and further comprising the steps of monitoring errors in communicating information packets between the first and second modems and varying a modulation method of the modems in dependence upon monitored errors.

47. A method as claimed in claim 42 and further comprising the steps of buffering information packets in information packet buffers at the first and second modems, monitoring fills of the information packet buffers, and varying a ratio of information packets communicated downstream to information packets communicated upstream in dependence upon the monitored fills.

48. A network access arrangement for providing communications with a CSMA/CD (Carrier Sense Multiple Access with Collision Detection) path via a communications path, comprising:

a first unit for coupling a first end of the communications path to the CSMA/CD path, the first unit comprising a CSMA/CD interface for connection to the CSMA/CD path, a buffer for buffering information packets supplied from the CSMA/CD path via the CSMA/CD interface for supply to the communications path, a buffer for buffering information packets received from the communications path for supply to the CSMA/CD path via the CSMA/CD interface, and a control unit; and a second unit for connection to a second end of the communications path, the second unit comprising a buffer for buffering information packets received via the communications path, a buffer for buffering information packets to be supplied to the communications path, and a control unit;

wherein the control units of the first and second units are arranged to exchange control information via the communications path for communicating information packets bidirectionally via the communications path between the buffers of the first and second units in a half duplex manner.

49. A network access arrangement as claimed in claim 48 wherein the first and second units comprise modems for communicating the information packets and control information as modulated signals via the communications path.

50. A network access arrangement as claimed in claim 49 wherein the modems of the first and second units are arranged to produce the modulated signals at frequencies greater than telephone signal frequencies, and each of the first and second units includes a frequency diplexer via which the units are coupled to the communications path, the diplexers having further connections for telephone equipment for simultaneous communications of telephone signals via the communications path.

51. A network access arrangement as claimed in claim 48 wherein the first unit comprises respective buffers for a plurality of communications paths and further comprises a multiplexer and demultiplexer for multiplexed connections of the CSMA/CD interface via respective buffers to respective communications paths.

52. A network access arrangement as claimed in claim 48 wherein the second unit comprises a CSMA/CD interface for coupling information packets between the buffers of the second unit and a CSMA/CD path at the second end of the communications path.

53. A network access arrangement as claimed in claim 49 wherein the second unit comprises a CSMA/CD interface for coupling information packets between the buffers of the second unit and a CSMA/CD path at the second end of the communications path.

54. A network access arrangement as claimed in claim 50 wherein the first unit comprises respective buffers for a plurality of communications paths and further comprises a multiplexer and demultiplexer for multiplexed connections of the CSMA/CD interface via respective buffers to respective communications paths.

55. A network access arrangement as claimed in claim 54 wherein the second unit comprises a CSMA/CD interface for coupling information packets between the buffers of the second unit and a CSMA/CD path at the second end of the communications path.

56. A modem for communicating information packets of Ethernet frames via a two-wire line, comprising:

a control unit;

an interface for supplying and receiving information packets of Ethernet frames;

a first buffer for receiving and buffering information packets from the interface;

a modulator responsive to the control unit for supplying modulated signals comprising information packets from the first buffer to a two-wire line;

a demodulator for demodulating modulated signals received via the two-wire line to produce demodulated signals; and a second buffer for receiving and buffering information packets contained in the demodulated signals for supply to the interface;

wherein the control unit is arranged to produce or respond to control information in the modulated signals on the two-wire line to control the modulator to supply modulated signals to the two-wire line only at times when modulated signals are not being received via the two-wire line.

57. A modem as claimed in claim 56 wherein the interface comprises a CSMA/CD (Carrier Sense Multiple Access with Collision Detection) interface to a CSMA/CD path.

58. A modem as claimed in claim 56 wherein the modulator supplies, and the demodulator demodulates, said modulated signals at frequencies greater than telephone signal frequencies, and further comprising a frequency diplexer for coupling the modulated signals to and from the two-wire line and having a two-wire connection for telephone equipment for simultaneously coupling telephone signals to and from the two-wire line.

59. A modem as claimed in claim 56 and further comprising a high pass filter for coupling the two-wire line to the demodulator, the high pass filter providing a matched termination for the two-wire line.

60. A modem as claimed in claim 59 and further comprising a current generator for coupling the modulator to the two-wire line.

61. A modem as claimed in claim 56 wherein the control unit is arranged to produce said control information for said modulated signals on a plurality of two-wire lines, the modem comprising respective first and second buffers for buffering information packets in respect of each of the plurality of lines, the modem further comprising a multiplexer controlled by the control unit to couple any of the plurality of two-wire lines to the demodulator, and a demultiplexer controlled by the control unit to couple the modulator to any of the plurality of two-wire lines.

62. A modem as claimed in claim 61 and including a store controlled by the control unit for storing and supplying to the modulator or demodulator information relating to modulation or demodulation, respectively, characteristics for each of the plurality of two-wire lines.

63. A modem as claimed in claim 61 wherein the modulator supplies, and the demodulator demodulates, said modulated signals at frequencies greater than telephone signal frequencies, and further comprising a frequency diplexer for coupling the modulated signals to and from the two-wire line and having a two-wire connection for telephone equipment for simultaneously coupling telephone signals to and from the two-wire line.

64. A modem as claimed in claim 63 wherein the interface comprises a CSMA/CD (Carrier Sense Multiple Access with Collision Detection) interface to a CSMA/CD path.

65. A modem as claimed in claim 61 wherein the interface comprises a CSMA/CD (Carrier Sense Multiple Access with Collision Detection) interface to a CSMA/CD path.

66. A method as claimed in claim 47 wherein the modems communicate via the line at frequencies greater than telephone signal frequencies and the method further comprises the step of frequency diplexing telephone signals and modem communications on the line.

67. A method as claimed in claim 47 and further comprising the step of multiplexing the first modem for communications with a plurality of second modems.

68. A method as claimed in claim 47 and further comprising the steps of monitoring errors in communicating information packets between the first and second modems and varying a signal bandwidth of the modems in dependence upon monitored errors.

69. A method as claimed in claim 47 and further comprising the steps of monitoring errors in communicating information packets between the first and second modems and varying a modulation method of the modems in dependence upon monitored errors.

70. A modem as claimed in claim 58 wherein the interface comprises a CSMA/CD (Carrier Sense Multiple Access with Collision Detection) interface to a CSMA/CD path.

71. A modem for coupling a device to a two-wire line for providing packetized communications for the device via the line, the modem comprising:

an interface for coupling to the device;

a controller;

a demodulator for receiving, from the line and for demodulating downstream modulated signals comprising control signals for the controller and information packets for supply via the interface to the device;

a buffer for buffering information packets received from the device via the interface; and a modulator for receiving information packets from the buffer for producing and supplying upstream modulated signals to the line, the controller being responsive to the demodulated control signals for controlling the modulator so that the upstream modulated signals are timed to avoid interference with the downstream modulated signals.

* * * * *